United States Patent
Olsen

(10) Patent No.: US 10,926,841 B2
(45) Date of Patent: Feb. 23, 2021

(54) MOORING ASSEMBLY FOR A FLOATING VESSEL

(71) Applicant: Fobox AS, Oslo (NO)

(72) Inventor: Thomas Fredrik Olsen, Oslo (NO)

(73) Assignee: Fobox AS, Oslo (NO)

( * ) Notice: Subject to any disclaimer, the term of this patent is extended or adjusted under 35 U.S.C. 154(b) by 0 days.

(21) Appl. No.: 16/894,817

(22) Filed: Jun. 7, 2020

(65) Prior Publication Data

US 2020/0317298 A1 Oct. 8, 2020

Related U.S. Application Data

(63) Continuation of application No. 16/317,445, filed as application No. PCT/EP2017/067365 on Jul. 11, 2017, now Pat. No. 10,870,466.

(30) Foreign Application Priority Data

Jul. 12, 2016 (NO) .................................. 20161159

(51) Int. Cl.
*B66D 1/36* (2006.01)
*B63B 21/10* (2006.01)
(Continued)

(52) U.S. Cl.
CPC ............. *B63B 21/10* (2013.01); *B63B 21/16* (2013.01); *B63B 21/29* (2013.01); *F03B 13/18* (2013.01);
(Continued)

(58) Field of Classification Search
CPC ......... F03B 13/18; B63B 21/04; B63B 21/16; B63B 21/663; B66D 1/36; B66D 1/365
See application file for complete search history.

(56) References Cited

U.S. PATENT DOCUMENTS 2,354,805 A 8/1944 Fey
3,078,060 A 2/1963 Le Bus
(Continued)

FOREIGN PATENT DOCUMENTS

GB 2477090 A 7/2011
WO WO-0216195 A1 2/2002
(Continued)

OTHER PUBLICATIONS

Freire Gomez, Jon, "International Search Report," prepared for PCT/EP2017/067365, dated Sep. 20, 2017, four pages.
(Continued)

*Primary Examiner* — Andrew Polay
(74) *Attorney, Agent, or Firm* — Shackelford, Bowen, McKinley & Norton, LLP

(57) ABSTRACT

A mooring arrangement for a floating device includes a band and a drum adapted to pay out and pull in the band. The mooring arrangement includes a band guide, the band is extending from the drum via the band guide and is adapted to be coupled to an anchoring arrangement, the band guide being configured to tilt about an articulation axis being parallel with a longitudinal axis of the part of the band situated between the drum and the band guide in order to position the band to compensate for movement in the floating device and thus reduce the wear in the band.

14 Claims, 29 Drawing Sheets

(51) Int. Cl.
*B63B 21/16* (2006.01)
*B63B 21/29* (2006.01)
*F03B 13/18* (2006.01)
*B63B 35/44* (2006.01)

(52) U.S. Cl.
CPC ........ *B63B 2035/4466* (2013.01); *B66D 1/36* (2013.01)

(56) References Cited

U.S. PATENT DOCUMENTS

| | | | |
|---|---|---|---|
| 3,305,218 A | 2/1967 | Bjöshol | |
| 3,347,526 A | 10/1967 | Cymmer | |
| 3,536,298 A * | 10/1970 | Deslierres | F16D 63/002 |
| | | | 114/254 |
| 3,782,319 A * | 1/1974 | Hale | B66C 13/02 |
| | | | 114/244 |
| 3,966,171 A | 6/1976 | Hale | |
| 4,597,352 A | 7/1986 | Norminton | |
| 4,634,102 A | 1/1987 | Appling et al. | |
| 4,648,343 A | 3/1987 | Hallberg et al. | |
| 8,823,196 B1 | 9/2014 | Gehring | |
| 2007/0018458 A1 | 1/2007 | Martinez | |

FOREIGN PATENT DOCUMENTS

| | | |
|---|---|---|
| WO | WO-2010067341 A2 | 6/2010 |
| WO | WO-2013180665 A1 | 12/2013 |

OTHER PUBLICATIONS

"Super Watt Wave Catcher Barge ©", Retrieved from: <https://web.archive.org/web/20160617172622/http://www.marineenergycorp.com/marine-energy/pdfs/super-watt-wave-catcher-barge-presentation-07312015.pdf> via Wayback Machine Dec. 19, 2015, Jul. 31, 2015, 98 pages.

* cited by examiner

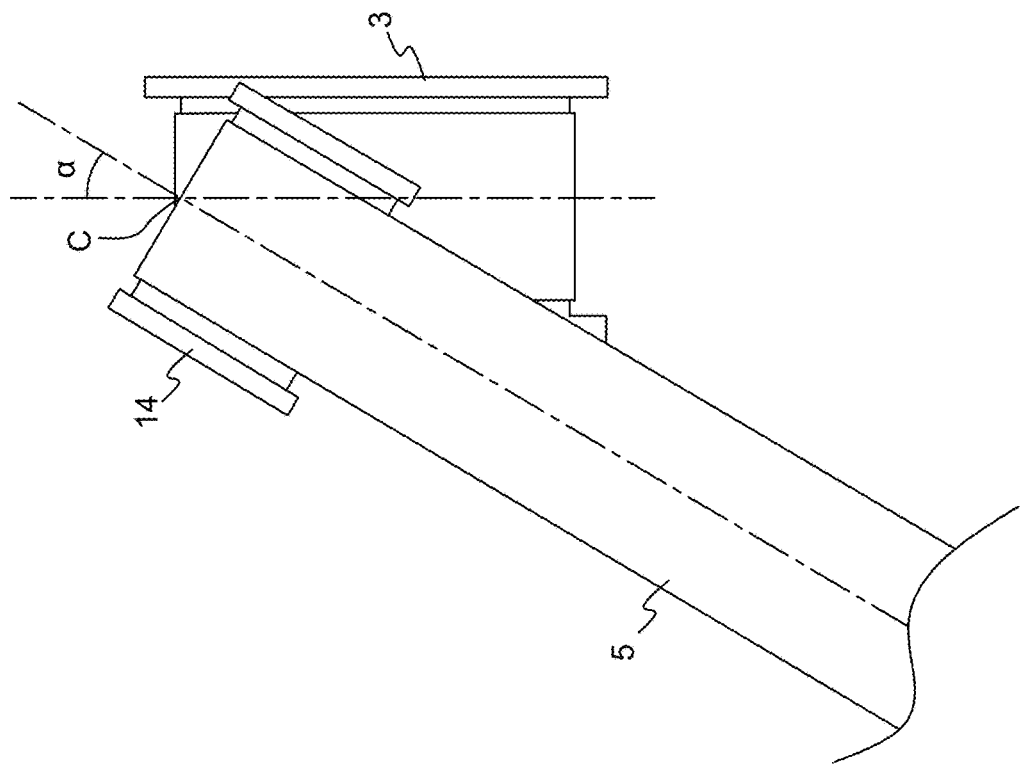
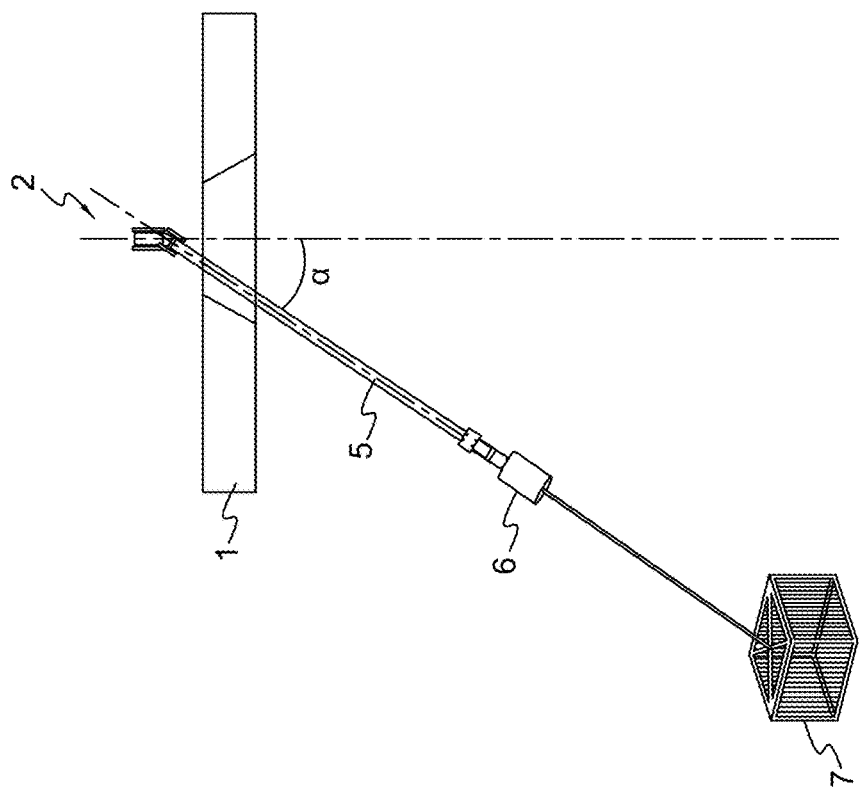
FIG. 11B
FIG. 11A

MOORING ASSEMBLY FOR A FLOATING VESSEL

TECHNICAL FIELD OF THE INVENTION

This invention relates to a mooring arrangement for a floating vessel.

BACKGROUND OF THE INVENTION

WO2010/067341 shows a wave power plant with a floating body which is set up to move under influence of waves, the floating body hosting an energy absorbing device. The energy absorbing device comprising a drum adapted to receive a wire. The wire is adapted to rotate the drum as a result of movement of the power plant. This movement could because of wave motion or other movement on the sea. The motion causes this movement causing only a small part of the wire to rotate on the drum. The wire being repeatedly bent over the drum under tension will lead to wear and eventually failure of this part of the wire.

Replacement of the wire with a flat band will reduce this wear mechanism and increase the lifetime of the system.

The introduction of a flat band in the mooring arrangement bring about other challenges. The relative wide band will require good alignment with drum as it is being winched on to avoid any strain gradient and kinks on the band.

An additional guide pulley mechanism that makes sure that the band is rotated correctly with a suitable angle on the drum is therefore preferably arranged to make sure that the band is rolled straight over the drum. An illustration of the mooring arrangement with and without a band guide is shown in FIGS. 9a and 9b and discussed in relation to these figures.

BRIEF SUMMARY OF THE INVENTION

Forces imposed on the floating device by current, wind and waves cause horizontal drift. This gives rise to a horizontal distance between floating device and mooring point (clump weight). This gives again rise to an angle between band and drum.

The horizontal distance causes an angle between the band and the floating device. Since the drum having an axial plane that is substantially parallel with the floating surface of the floating device, this could cause an askew winding of the band on the drum.

The band guide would prevent this and make sure the guide pulley follows the band and articulates relative to the drum to turn the angle between the band and drum. There will be a twist in the band in the area between the guide pulley and the drum but this is considered less harmful and causing less wear on the band than without the band pulley.

The floating device could also be exposed to roll and pitch motion due wave motion. In this situation the plane through the surface of the floating device will have a different angle than the seabed.

A band guide is also preferably under these conditions to compensate for the angle difference between the floating device and the band.

In order for the band to roll straight over the guide pulley when the winch is pulling the band in, it is crucial that the guide pulley is aligned with the lower part of the band.

The guide is free to rotate around its axis and the band is therefore the only force that pose any moment on the guide and decide its rotational angle of the guide and guide pulley.

The second guide pulley and the first guide pulley are connected in the same housing. The second pulley is arranged below the first guide pulley. The second guide pulley has an increased arm to the rotational axis that greatly increases the bands moment on the guide and hence the bands ability to align guide and guide pulley with itself to avoid sideways tracking.

The two pulley setup also reduces risk of misalignment between band and guide pulleys.

The invention relates to a mooring arrangement for a floating device comprising a drum. The mooring arrangement further comprising a band and a band guide, said band is extending from the drum via the band guide and is adapted to be coupled to the anchoring arrangement, said band guide being configured to rotate and position the band to compensate for movement of the floating device in order to reduce the strain on the band.

This will reduce wear on the band, avoiding strain/kink because of an unsuitable angle of the band when winched on the drum.

Preferably the mooring arrangement further comprising base part adapted to be connected to the floating device, said band guide is pivotably coupled to the base part.

Preferably the base part is a frame having two legs adapted to support the band guide two on opposite sides.

Preferably the band guide comprising a single pulley.

Preferably, the band guide comprises a first and second pulley said first and second pulley are arranged in series in the longitudinal direction of the band guide.

Preferably the first pulley and second pulley are coupled to the same housing.

This provides better force control on the band.

Preferably the mooring arrangement having a sensor/load cell arrangement for measuring lateral load between the band and guide pulley flange.

It is therefore able to measure and reduce the tension if the lateral force on the band is too large.

Preferably the mooring arrangement further comprising a band end fitting coupling the mooring arrangement to the anchoring arrangement.

Preferably the band end fitting having a bend constrainer arranged on both sides of the band.

This ensures a certain minimum bending radius of the band.

Preferably the band end fitting comprising a float.

This ensures that the assembly is in an upright position even without the tension in the band.

Preferably the load cell is arranged between the band end fitting and the anchoring arrangement.

The tension could be measured in the mooring arrangement in order to compensate for the movement.

A floating device such as a lifesaver wave energy converter comprising at least one mooring arrangement according to any one of the embodiments disclosed.

The floating device is preferably a Fred. Olsen BOLT lifesaver wave energy converter.

The device preferably comprising three mooring arrangement disposed on the floating device, said at least one of the mooring arrangements is a double pulley arrangement.

Preferably said guide pulley comprising a winch portion adapted to receive the band and flanges arranged outside of the winch portion.

Preferably the height of the flanges above the winch portion are at least the thickness of the band 5.

This will prevent the bands tendency to track laterally on the guide pulley and to keep the band in the winch portion of the guide pulley.

FIGURES

The present invention will now be more particularly described by way of examples only, with reference to the accompanying drawings, in which.

Figure 3A:
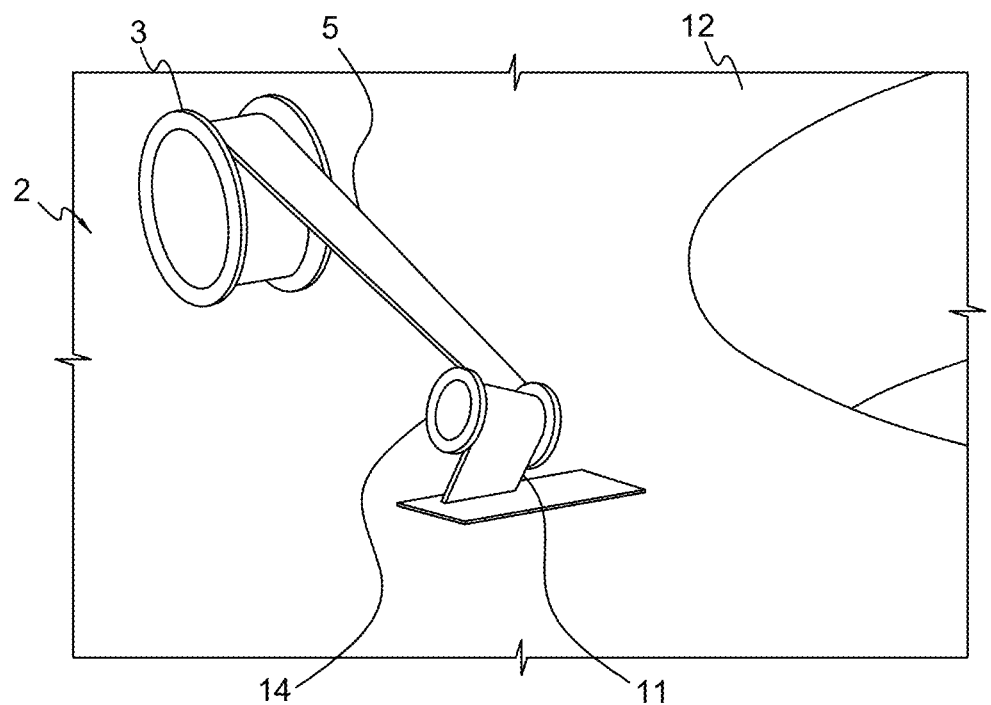

FIGS. 3a and b shows a detailed view of one embodiment of a mooring arrangement with a single guide pulley, side viewed and front viewed.

Figure 4:
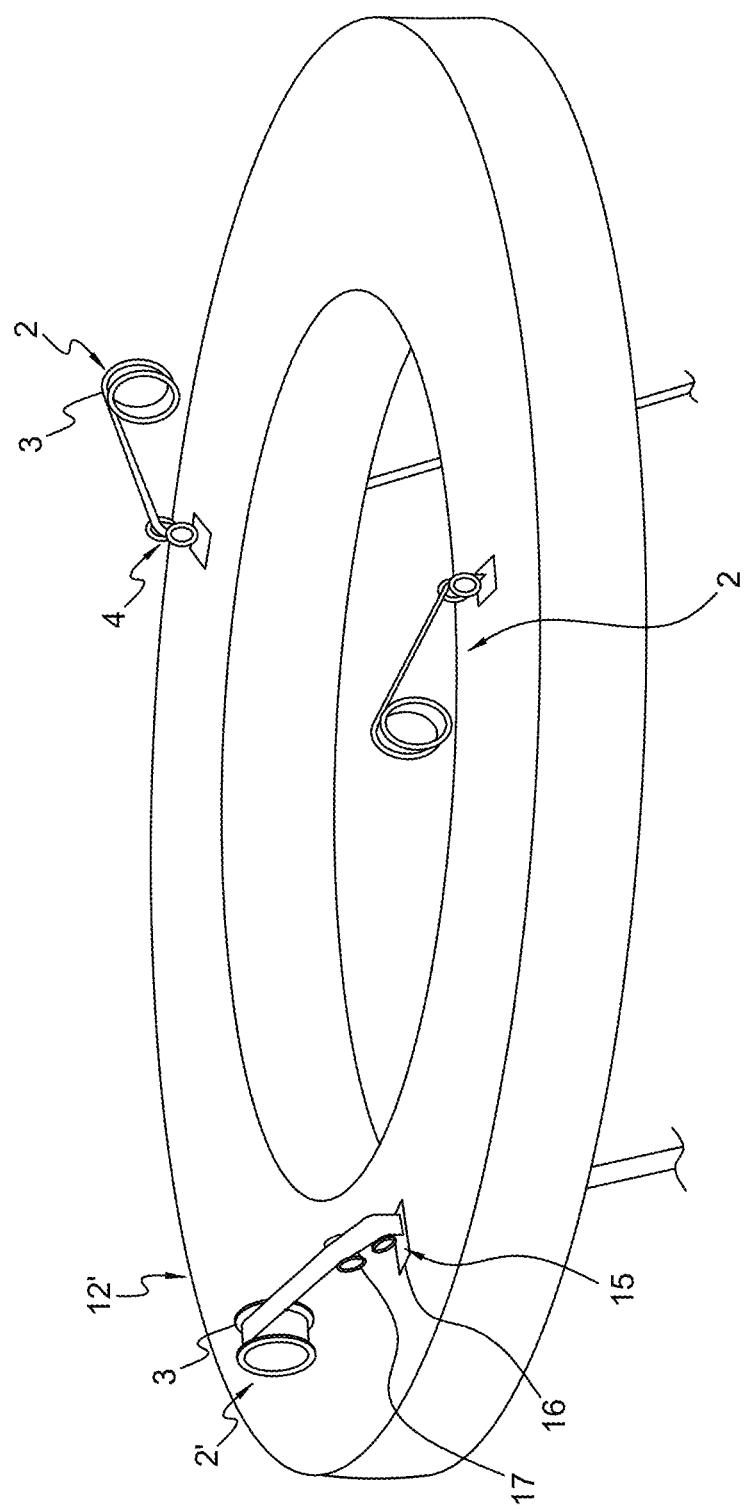

FIG. 4 shows a detailed view of one embodiment of a mooring arrangement where one of the mooring arrangements having a double guide pulley.

Figure 5A:
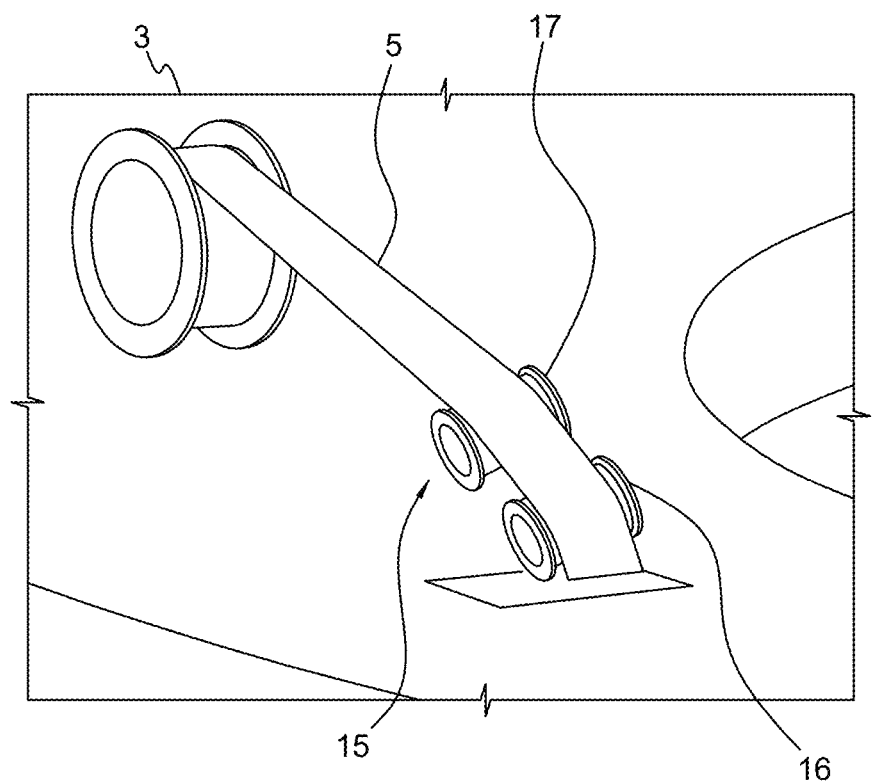
Figure 5B:
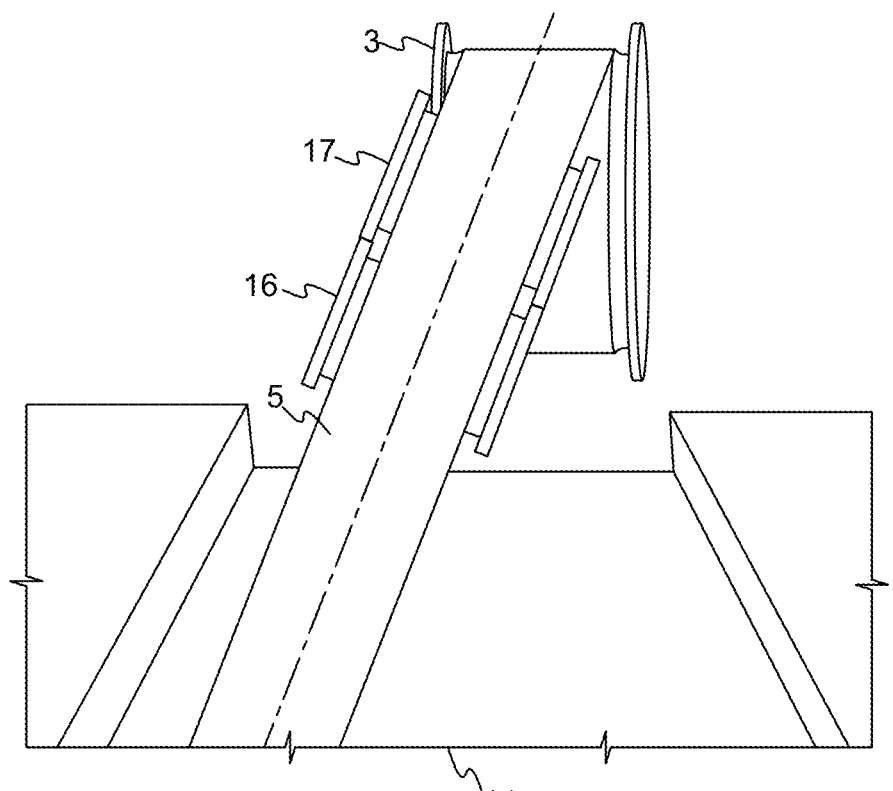

FIG. 5a-b shows a detailed view of the embodiment of the mooring arrangement with double guide pulley, side viewed and front viewed.

Figure 6A:
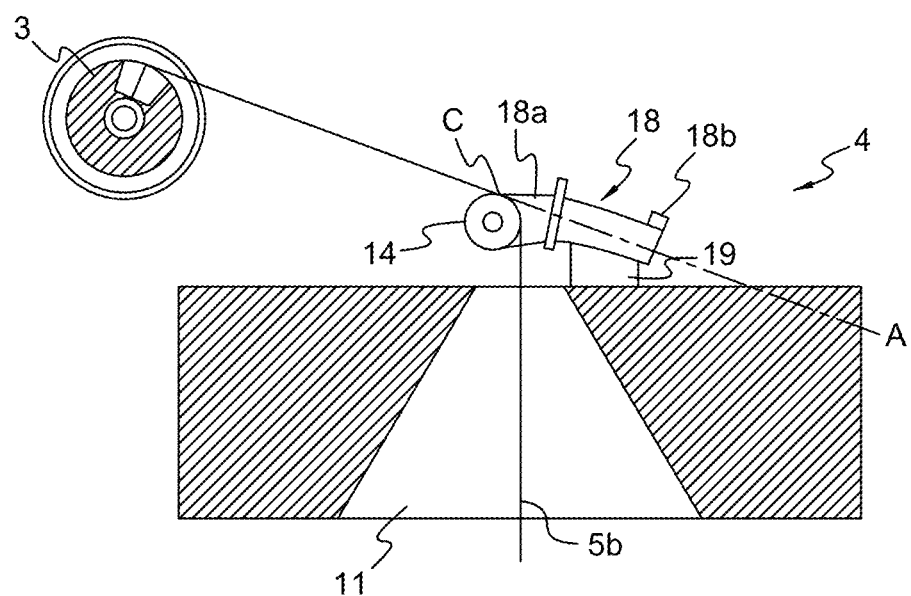

FIG. 6a shows a schematic view of a first embodiment of a mooring arrangement with single pulley, side view.

Figure 6B:
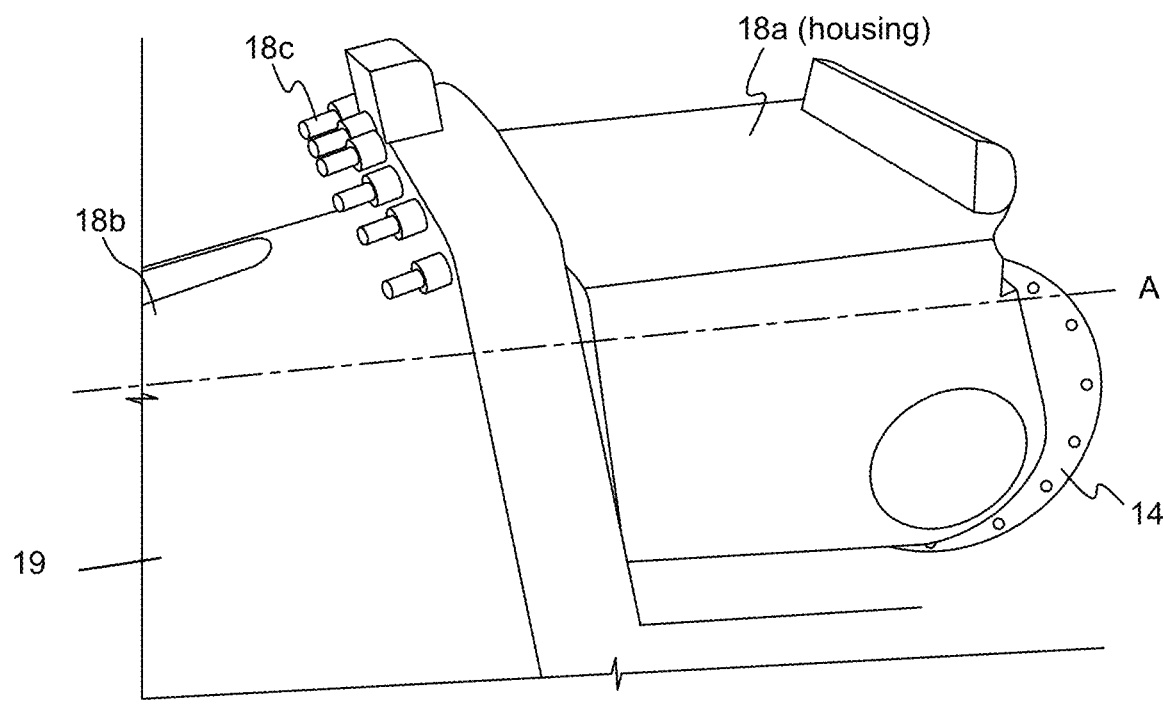

FIG. 6b shows the housing of mooring arrangement shown in FIG. 6a.

Figure 6C:
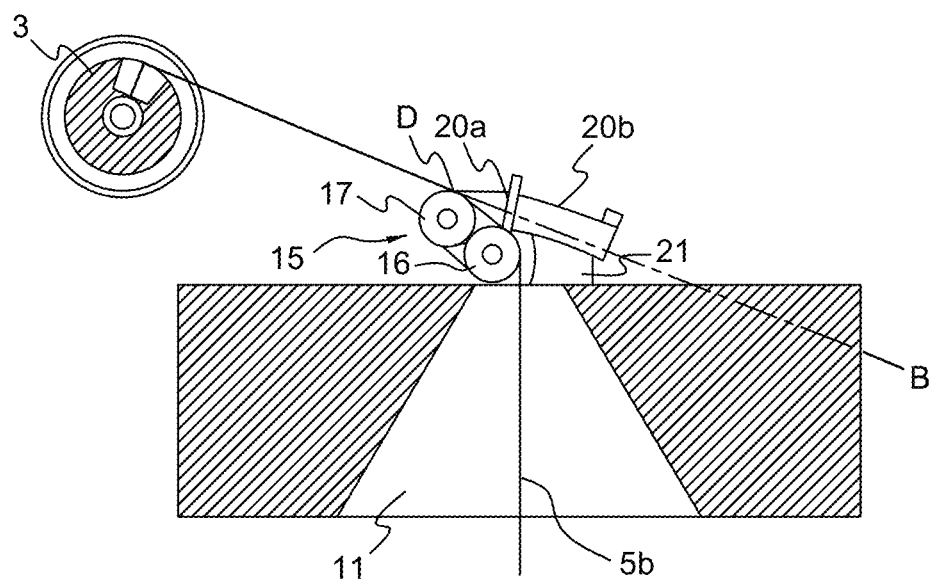

FIG. 6c shows a schematic view of a second embodiment of the mooring arrangement with double pulley, side view.

Figure 6D:
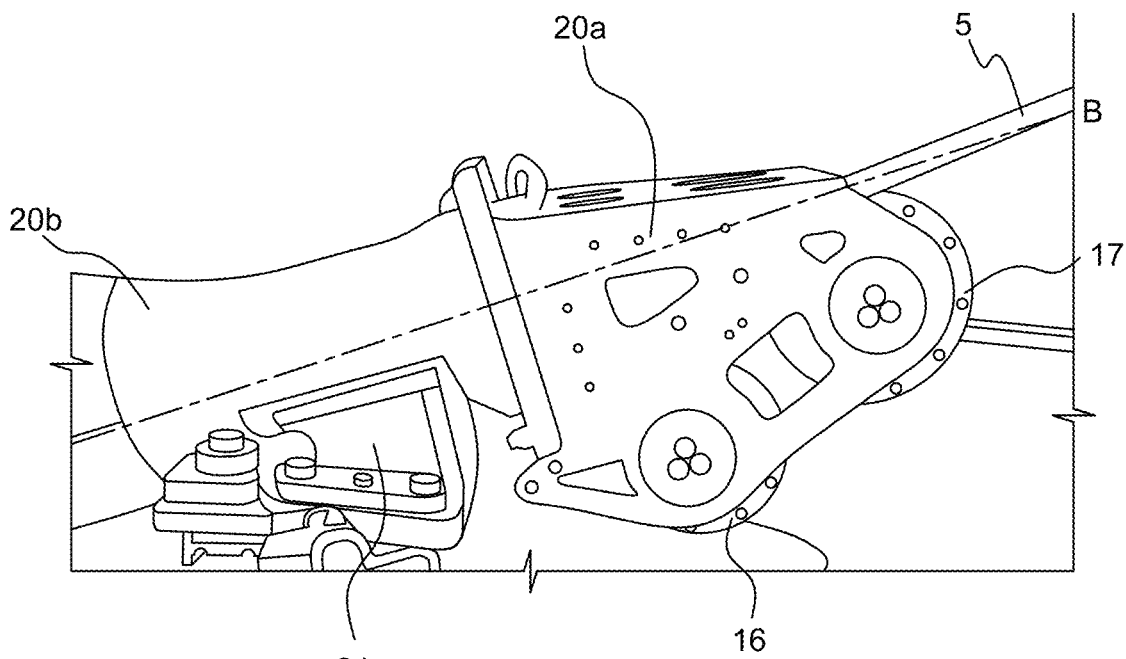

FIG. 6d shows the housing of the mooring arrangement shown in FIG. 6c.

FIG. 6e-h shows a third embodiment of a mooring arrangement according to the invention with double pulley, viewed from different sides.

Figure 6E:
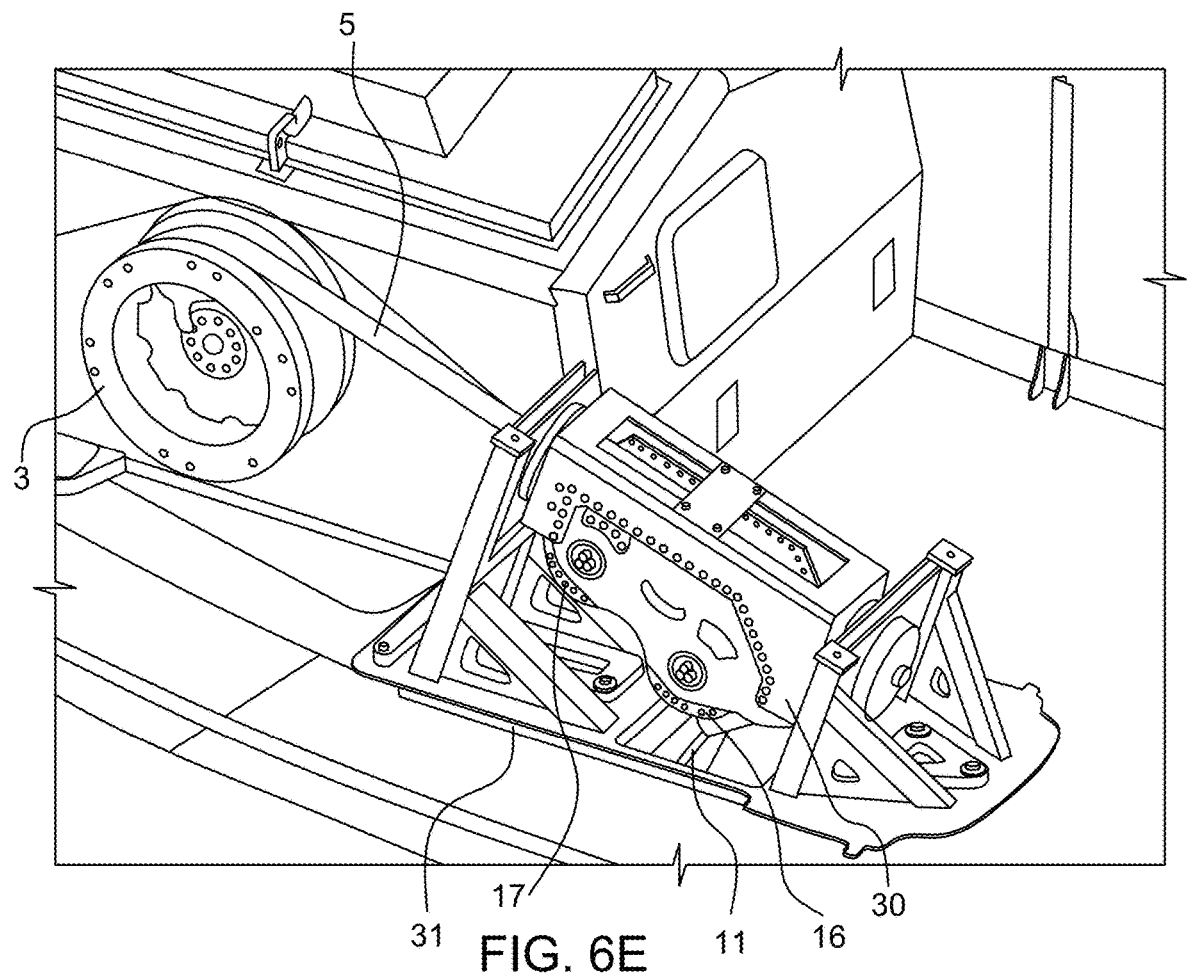
Figure 6F:
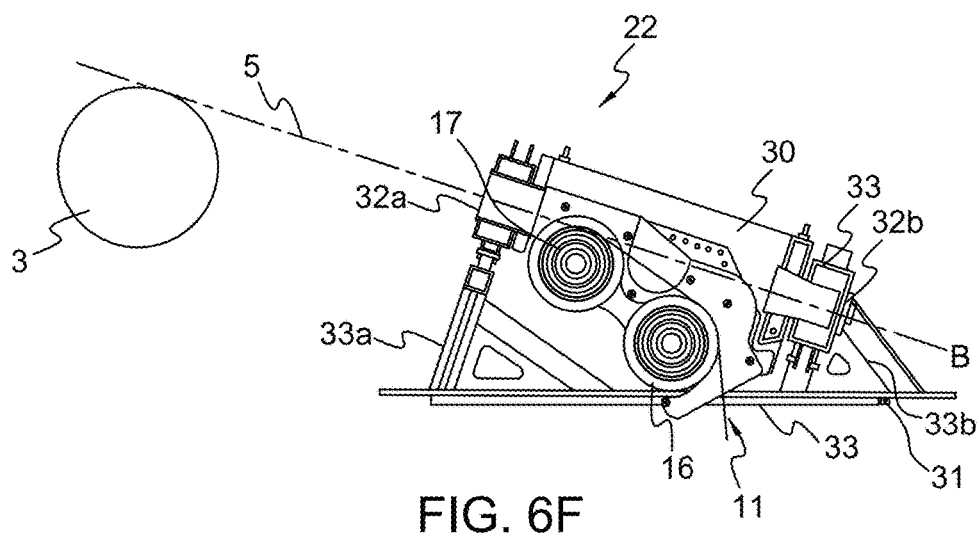
Figure 6G:
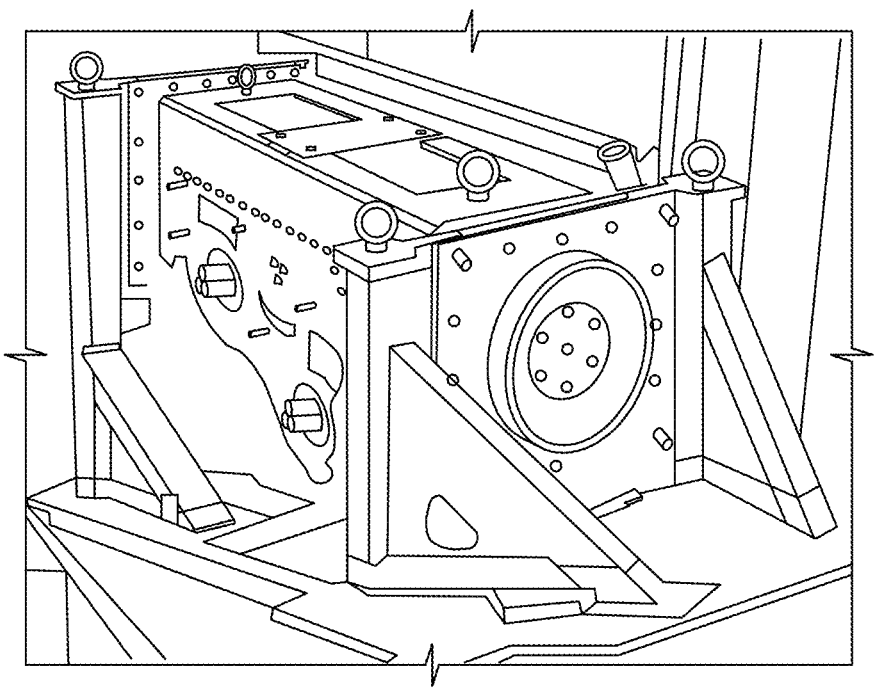
Figure 6H:
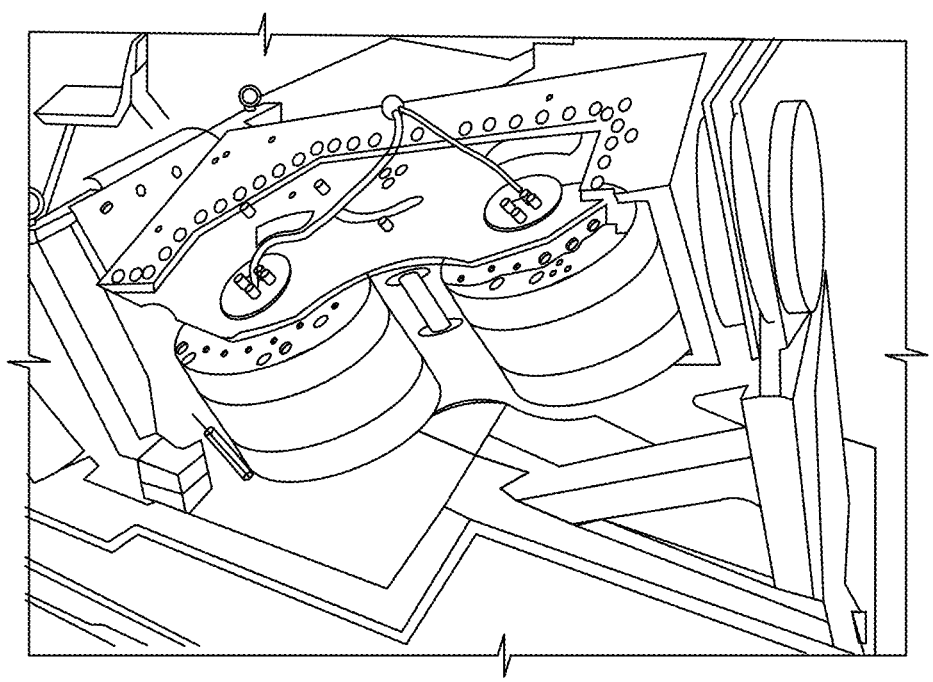
Figure 6I:
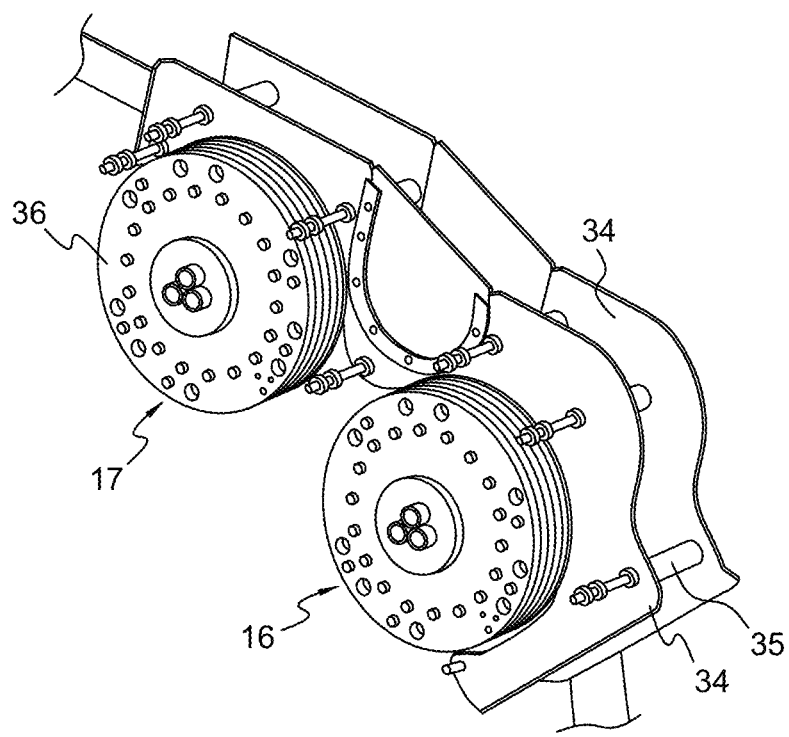
Figure 6J:
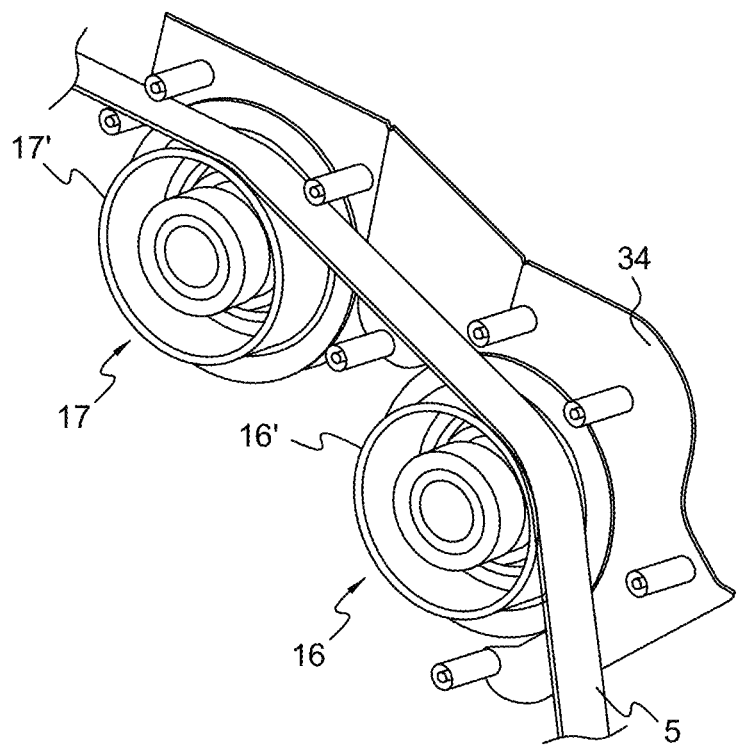

FIG. 6i-6j shows detail views of the double pulley arrangement from FIG. 6e-h, side viewed.

Figure 6K:
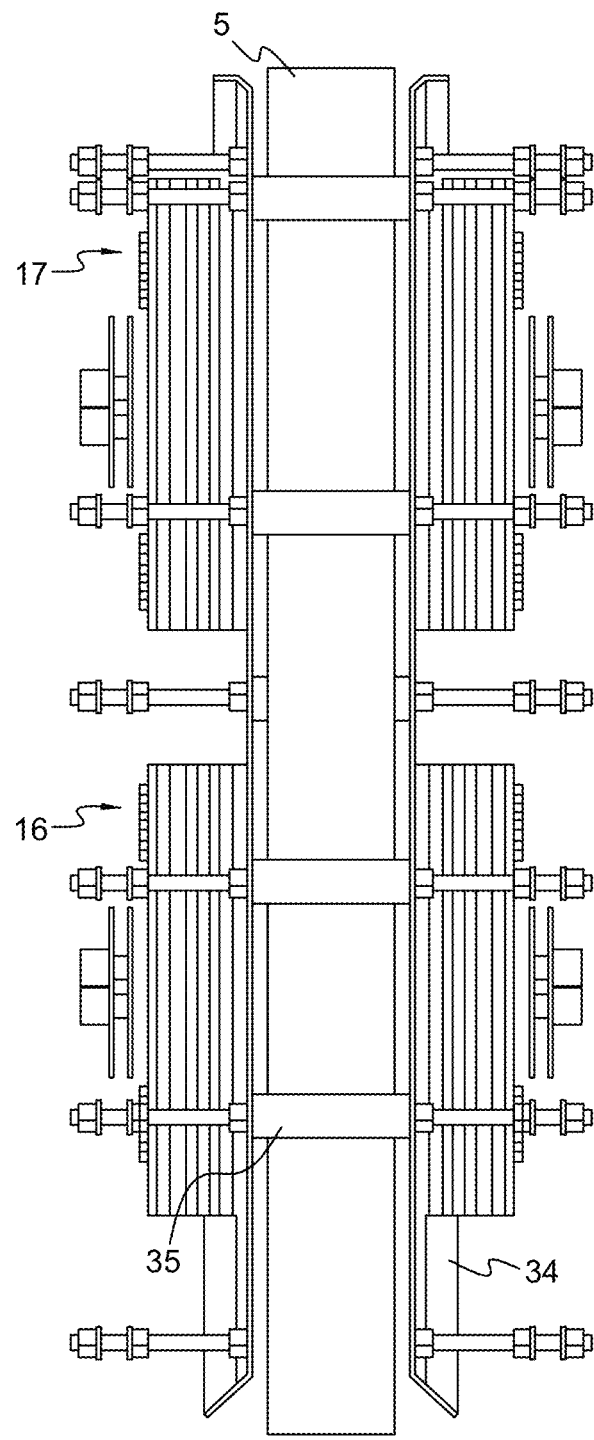

FIG. 6k shows a detailed view of the double pulley arrangement from FIG. 6i-j, viewed from above.

FIG. 6l-p shows details of a single guide pulley.

Figure 7A:
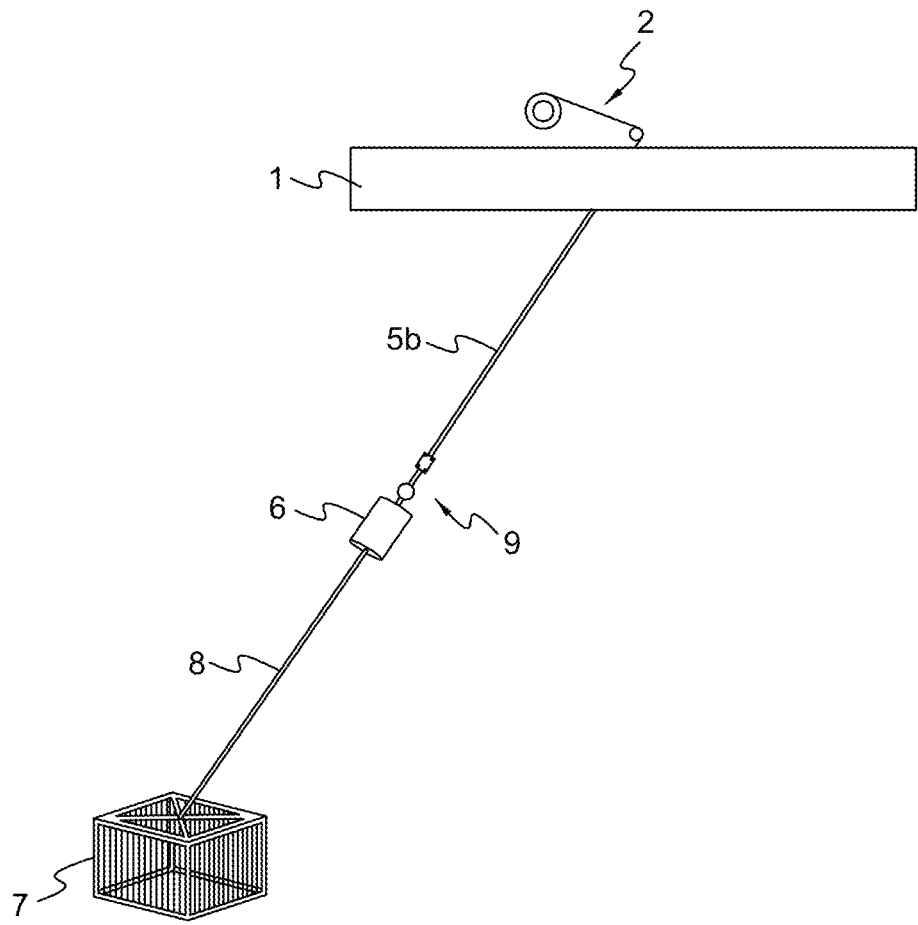

FIG. 7a shows a principle view of the mooring arrangement and the anchoring arrangement.

Figure 7B:
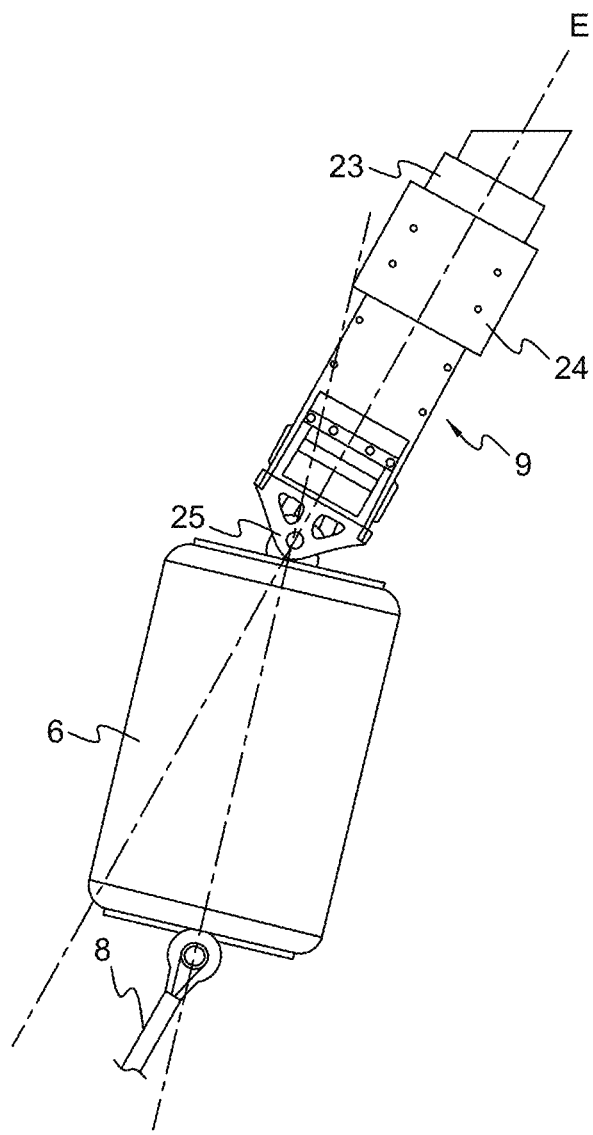
Figure 7D:
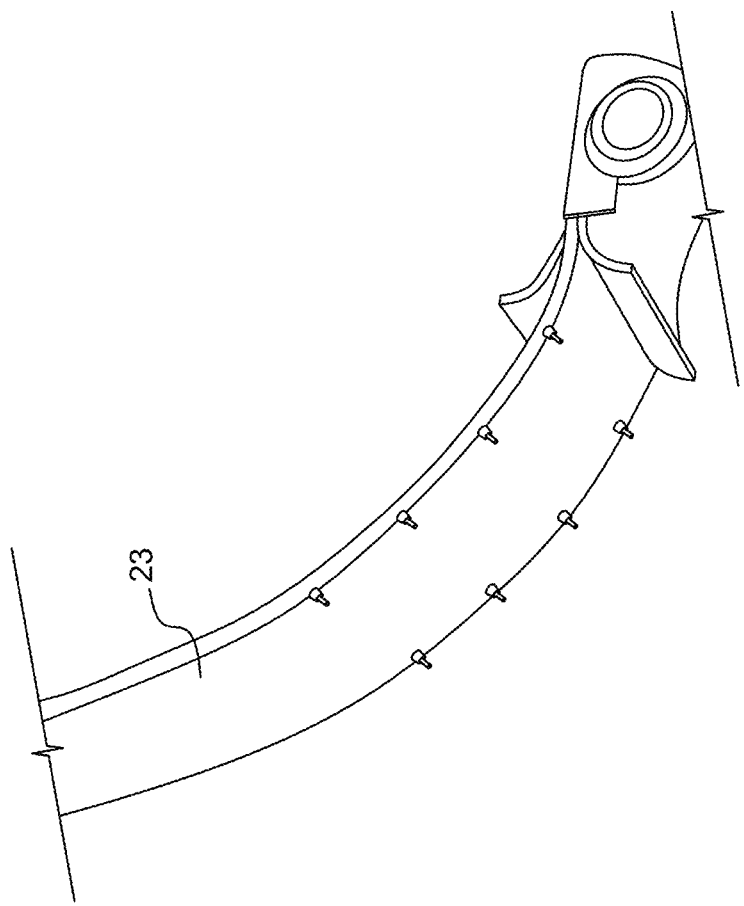
Figure 7C:
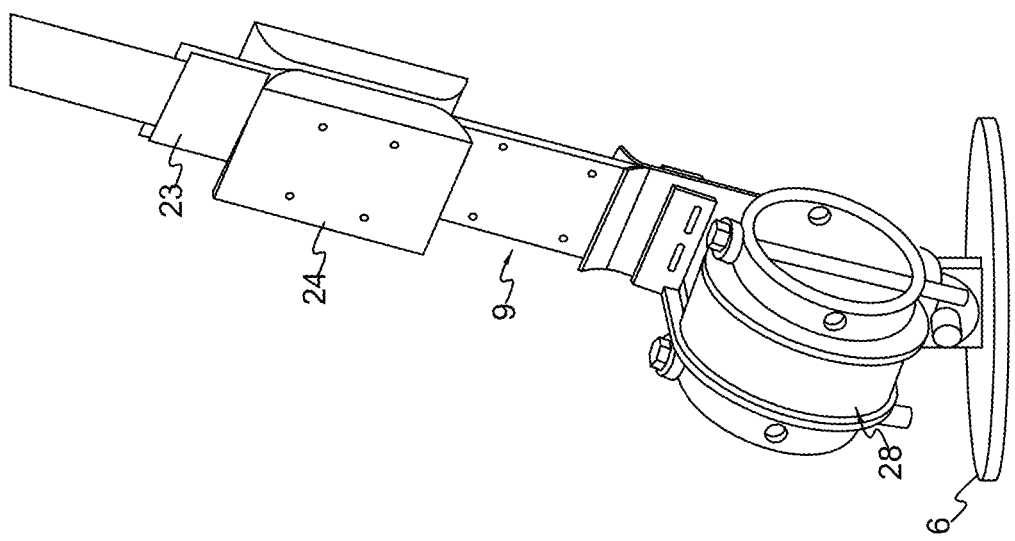

FIG. 7b-d shows a detailed view of the band fitting arrangement according to one embodiment of the invention.

Figure 7E:
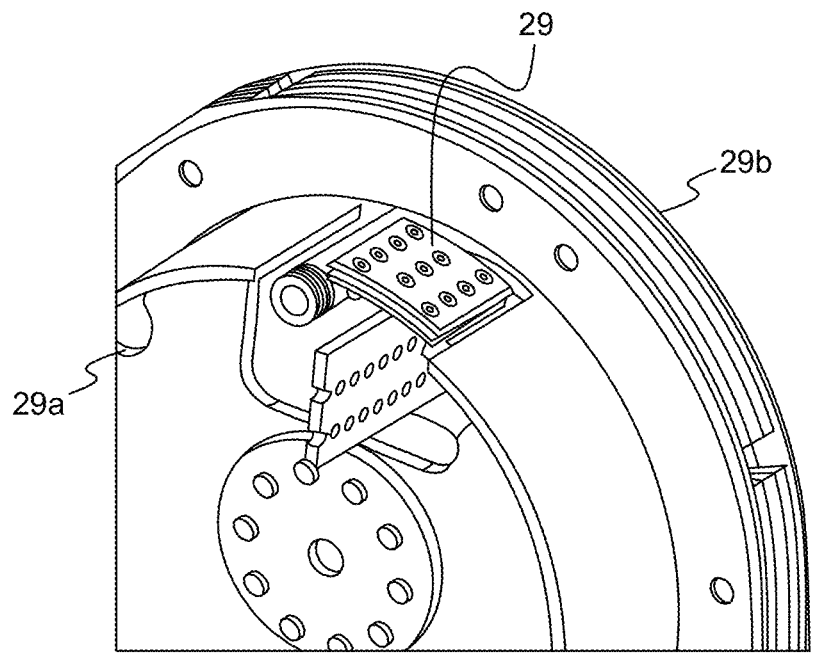
Figure 7F:
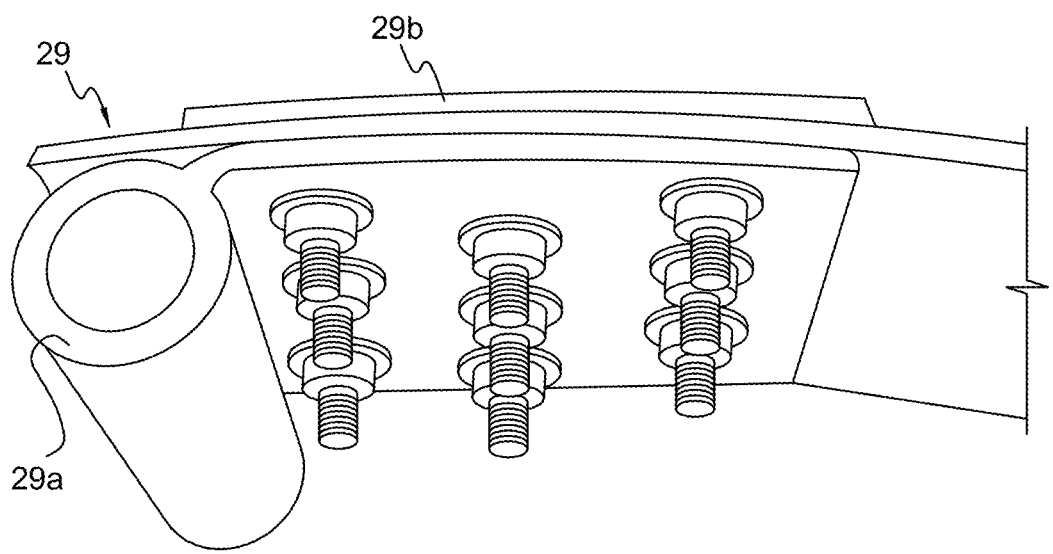

FIG. 7e-f shows a detailed view of the fastening device between the band and the band fitting arrangement.

Figure 8A:
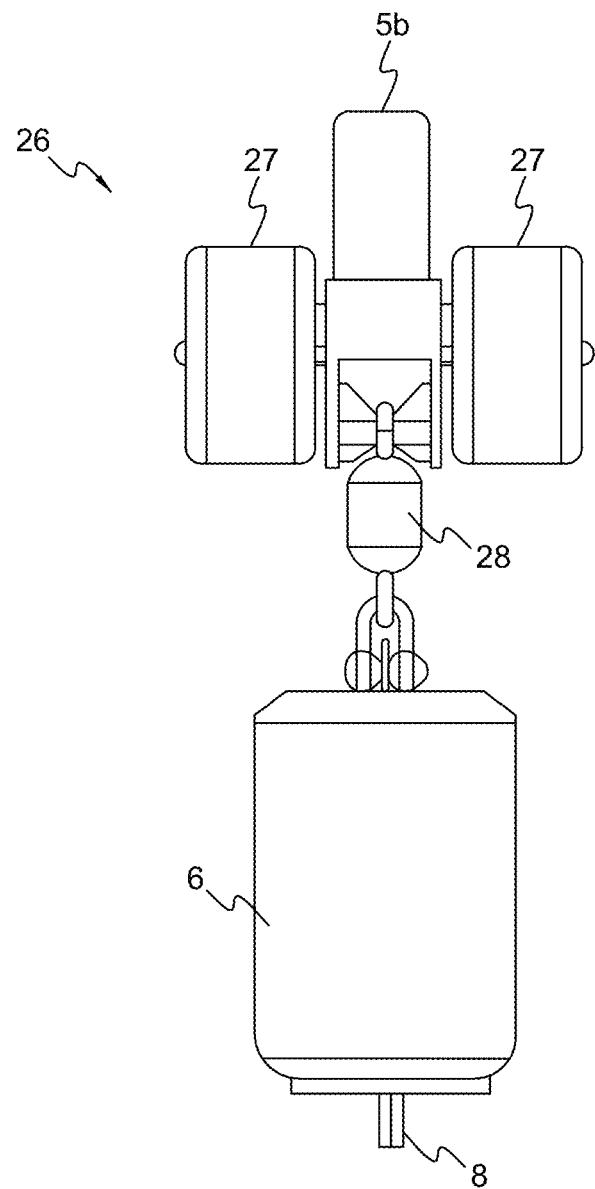

FIG. 8a shows the band end fitting according to another embodiment of the invention.

Figure 8C:
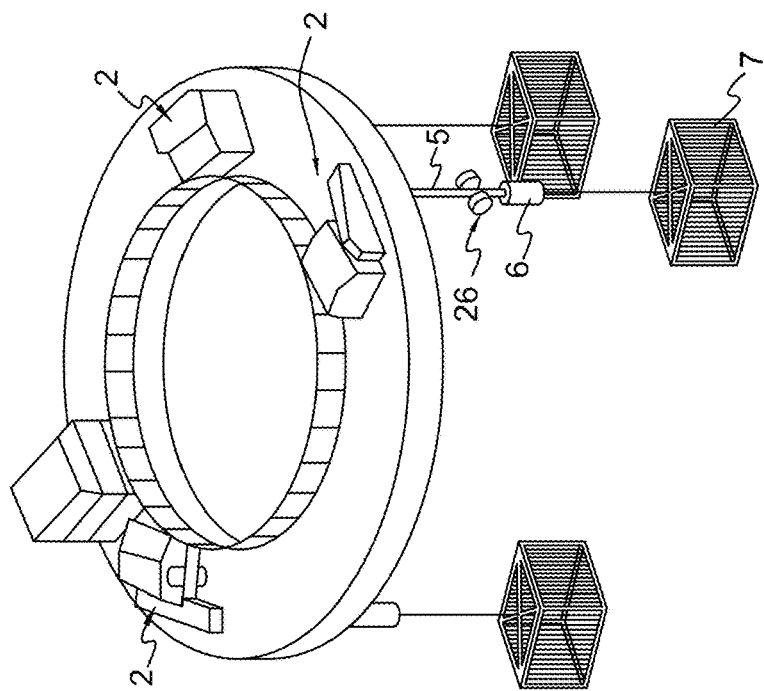
Figure 8B:
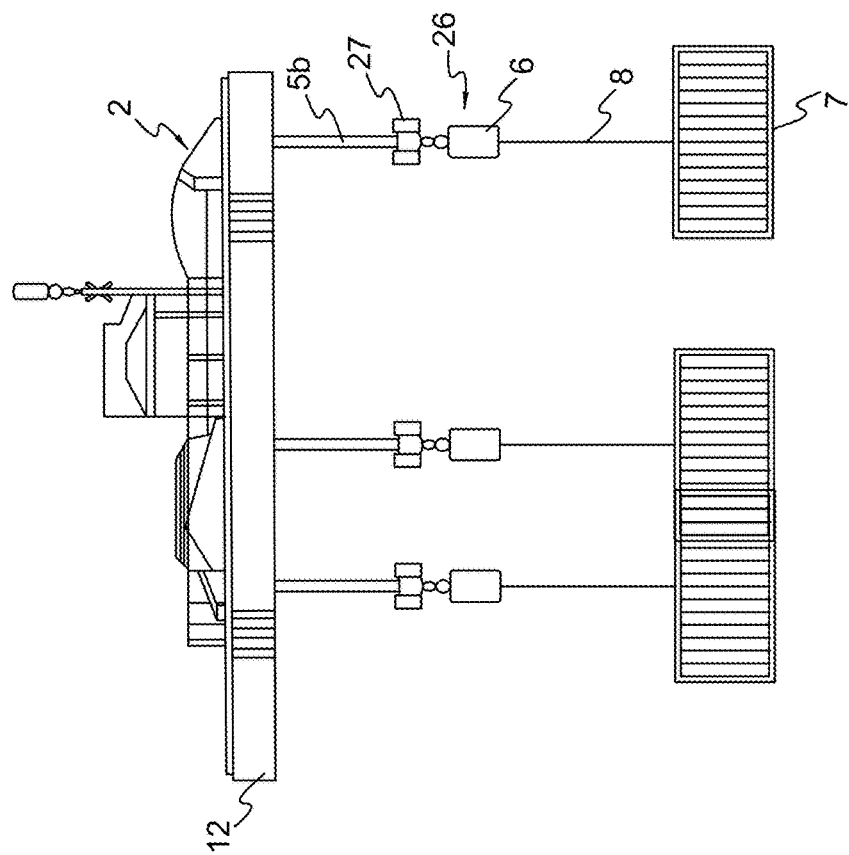

FIG. 8b-c shows the floating device with band end fitting according to the embodiment shown in FIG. 8a.

FIG. 9 shows the angle definitions of the band guide caused by rolling or pitching of the floating foundation.

Figure 9A:
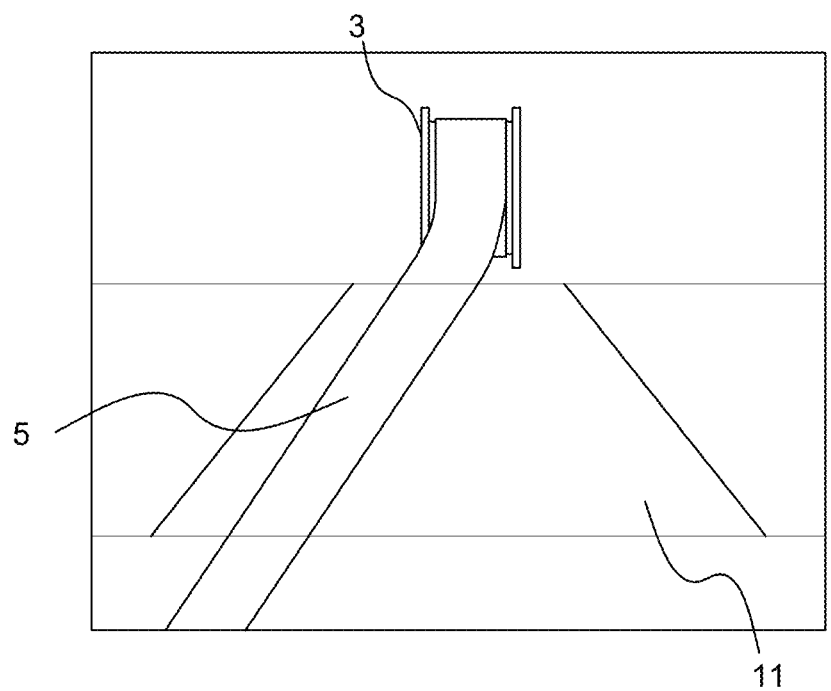

FIG. 9a shows a principle view of the mooring device without a guide pulley.

Figure 9B:
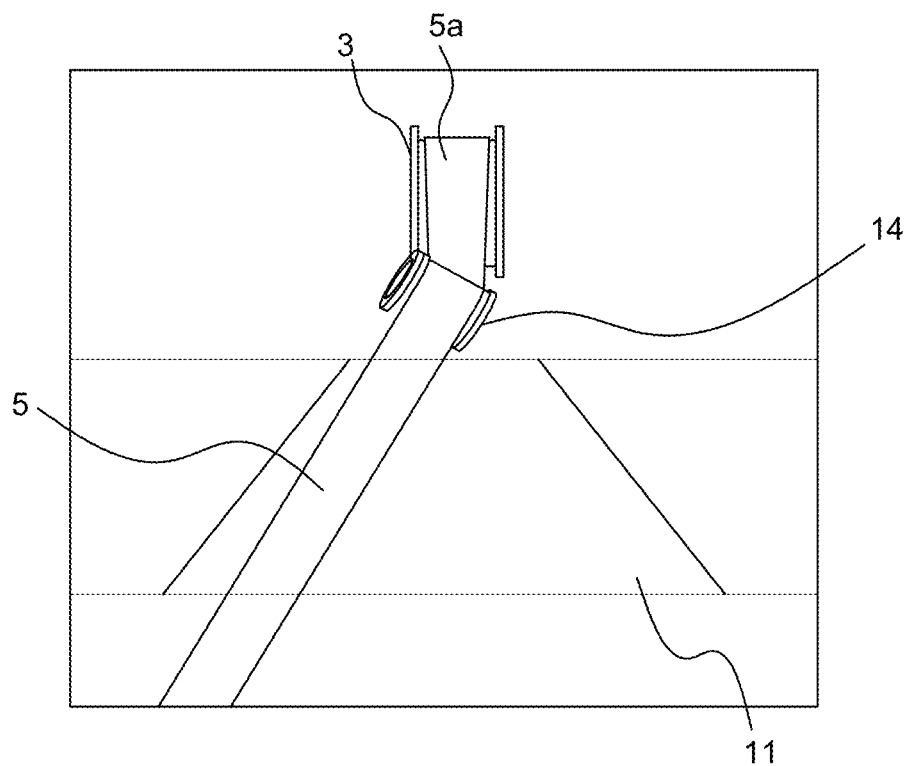

FIG. 9b shows a principle view of the mooring device with the guide pulley.

Figure 10A:
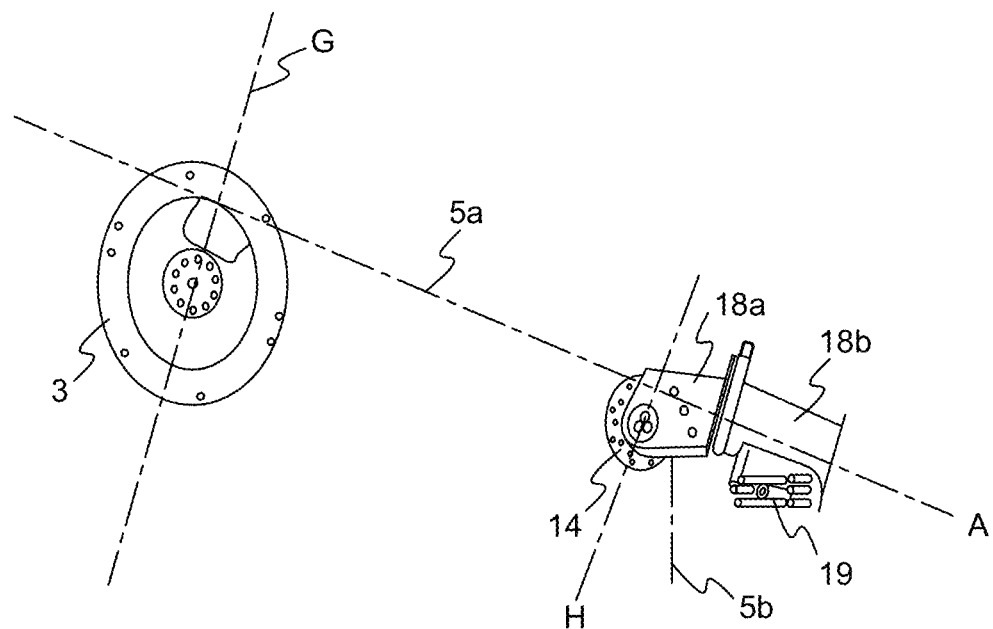
Figure 10B:
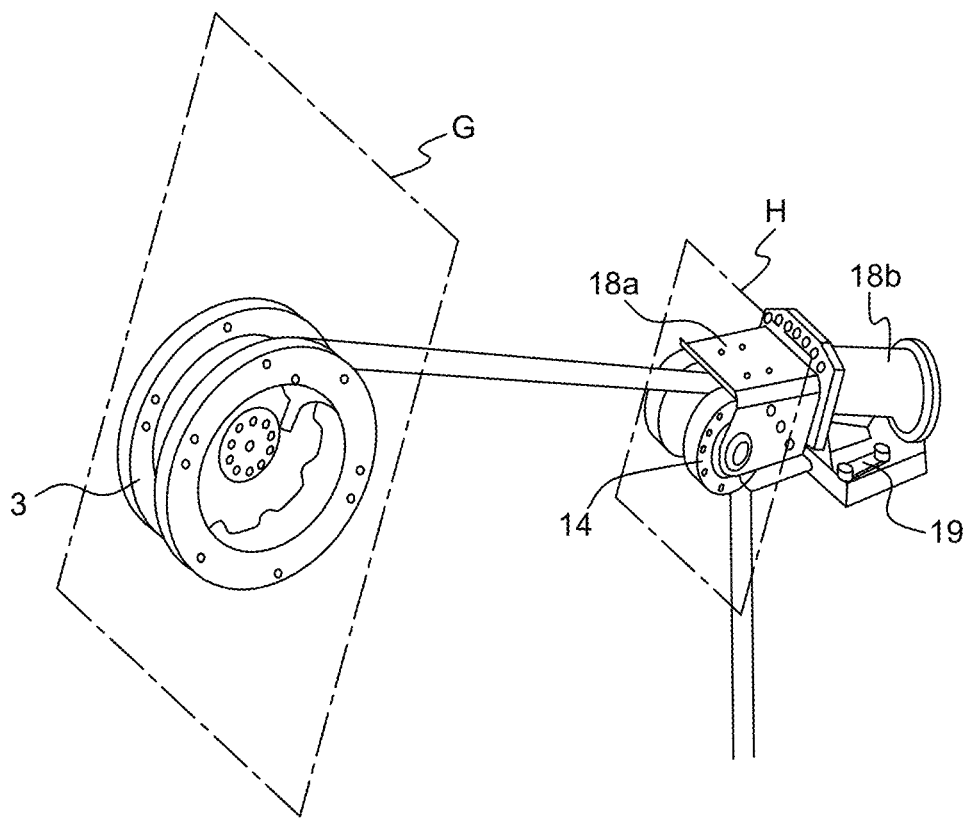

FIG. 10a-b shows the relation between the drum and band guide.

FIG. 11a-d shows a detailed view of possible rotations of the band guide.

Figure 12:
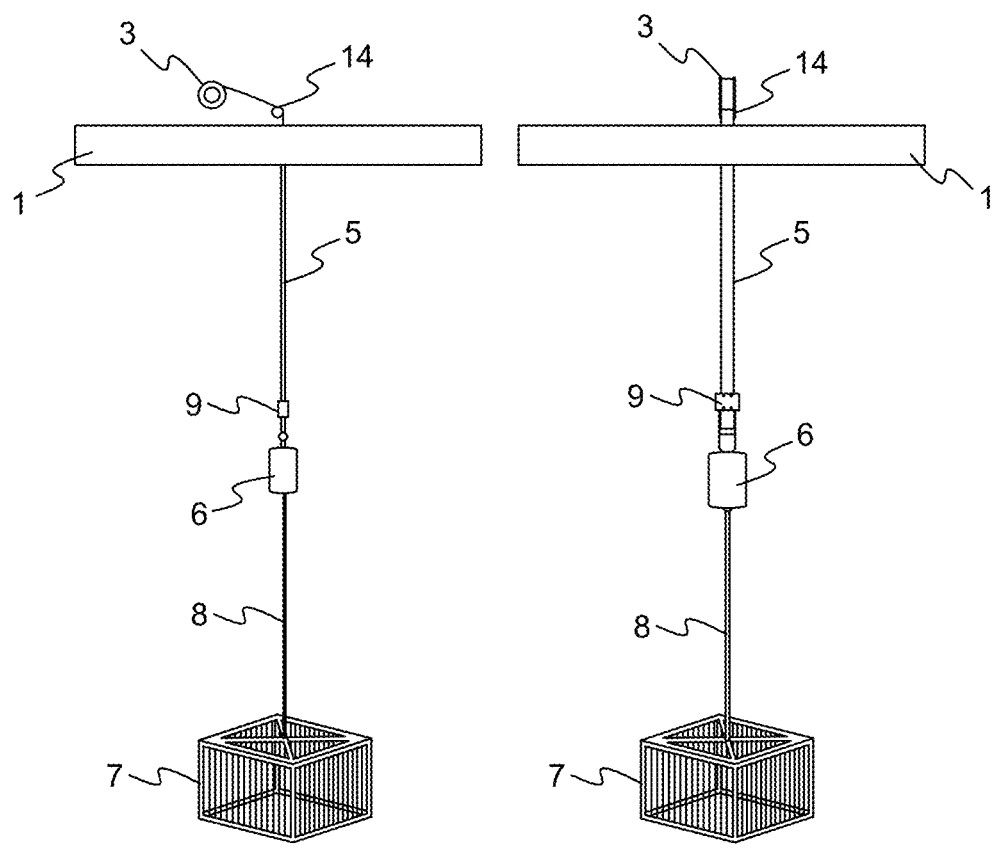

FIG. 12 shows the floating device in a resting position where no forces are acting on the floating device.

Figure 13B:
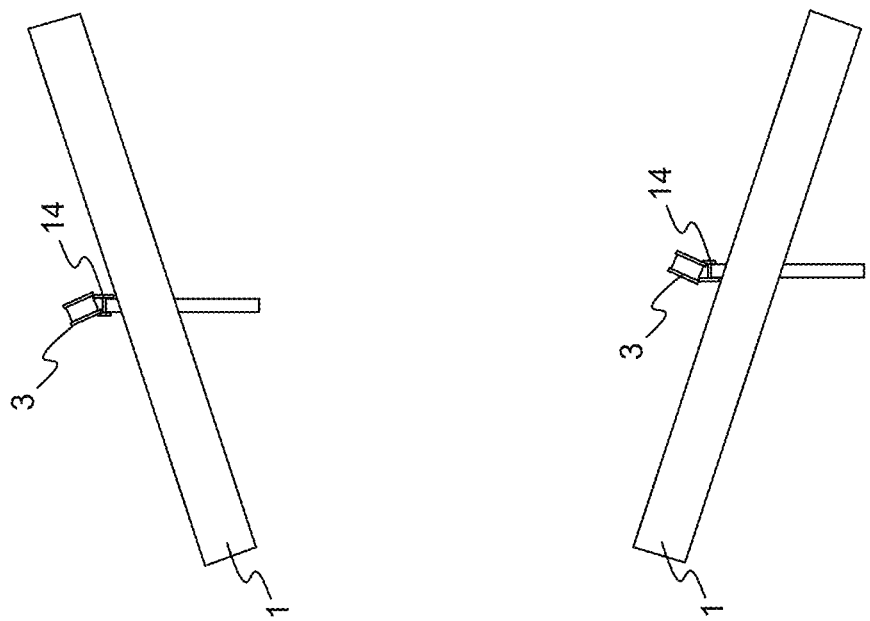
Figure 13A:
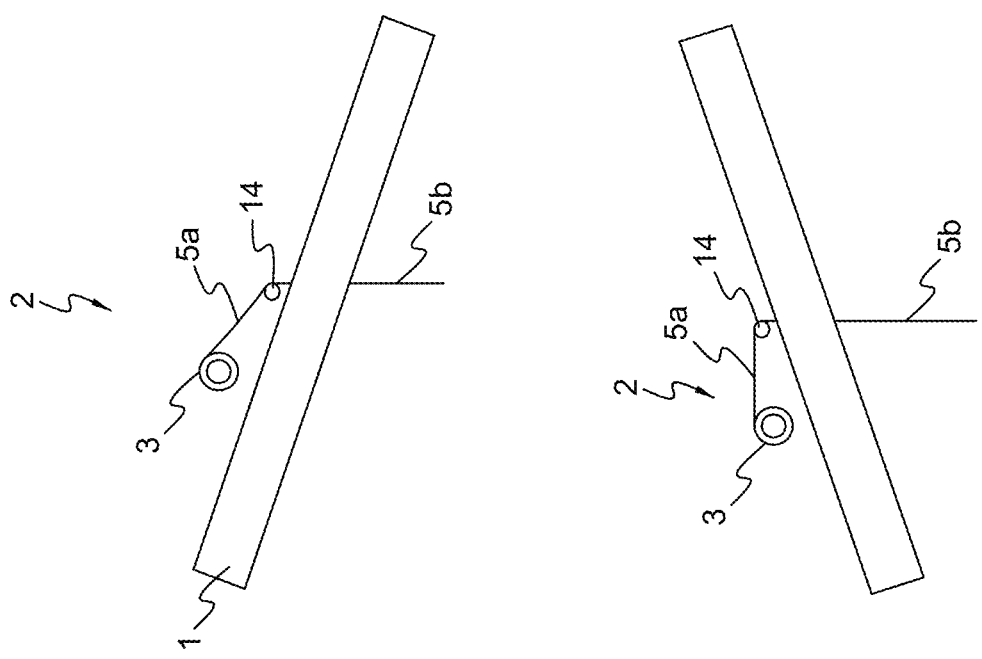

FIG. 13a-13b shows the floating device where the floating device is exposed to roll and pitch movement.

Figure 14:
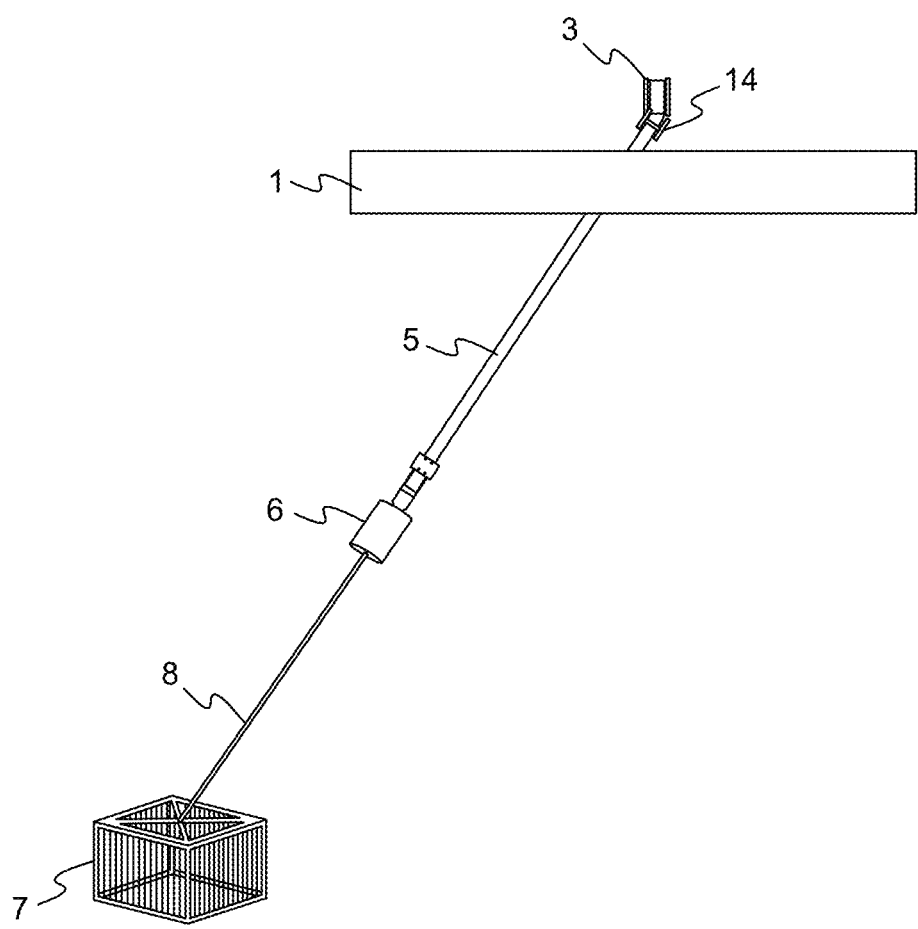

FIG. 14 shows the floating device where the floating device is exposed to horizontal drift movement.

FIG. 15a-f shows the orientation of the floating device on the sea surface when a wave is passing from left.

DETAILED DESCRIPTION OF PREFERRED EMBODIMENTS OF THE INVENTION

Figure 1:
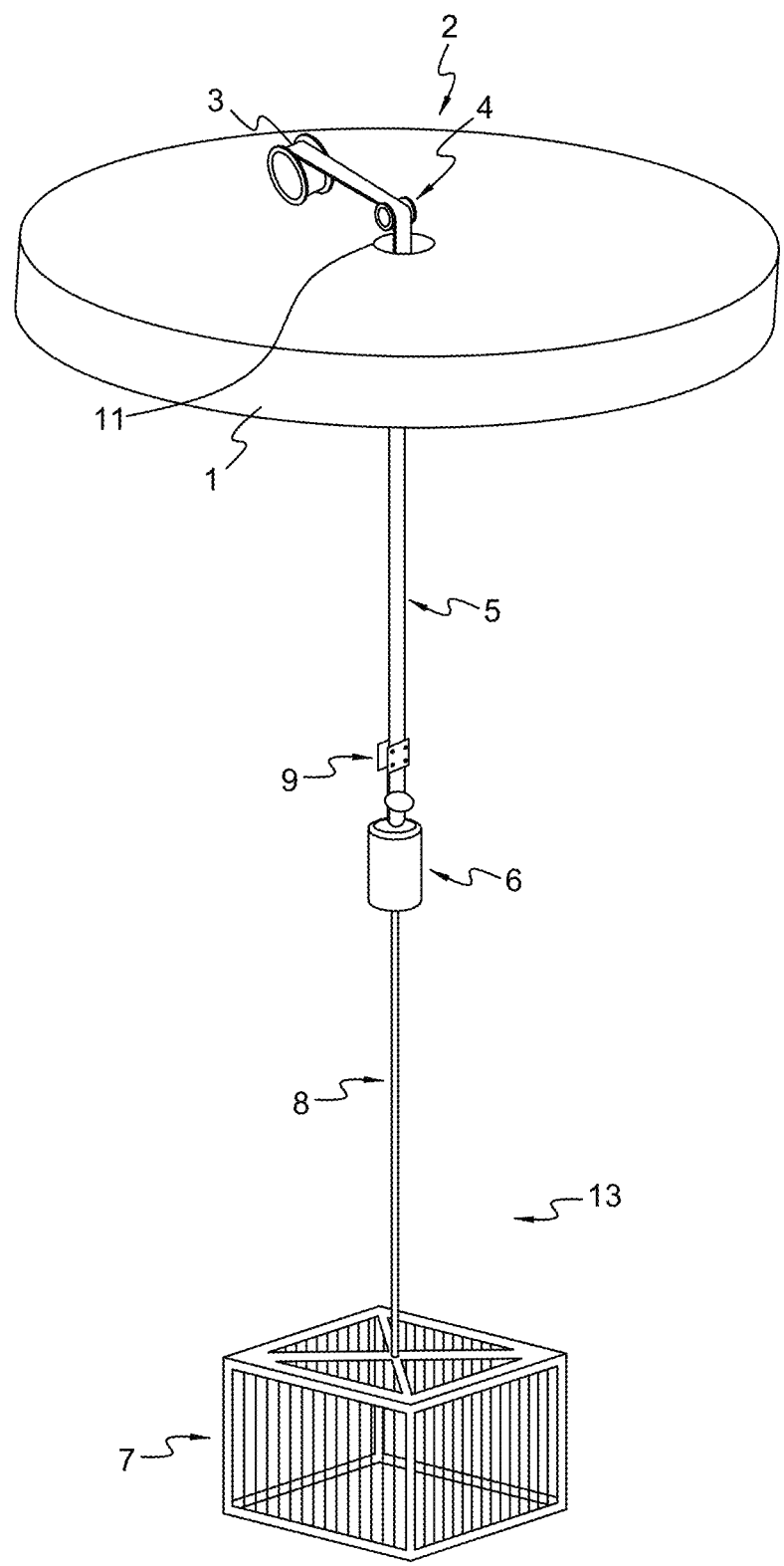
FIG. 1 is an overview the floating device with one mooring arrangement according to the invention.
Figure 2:
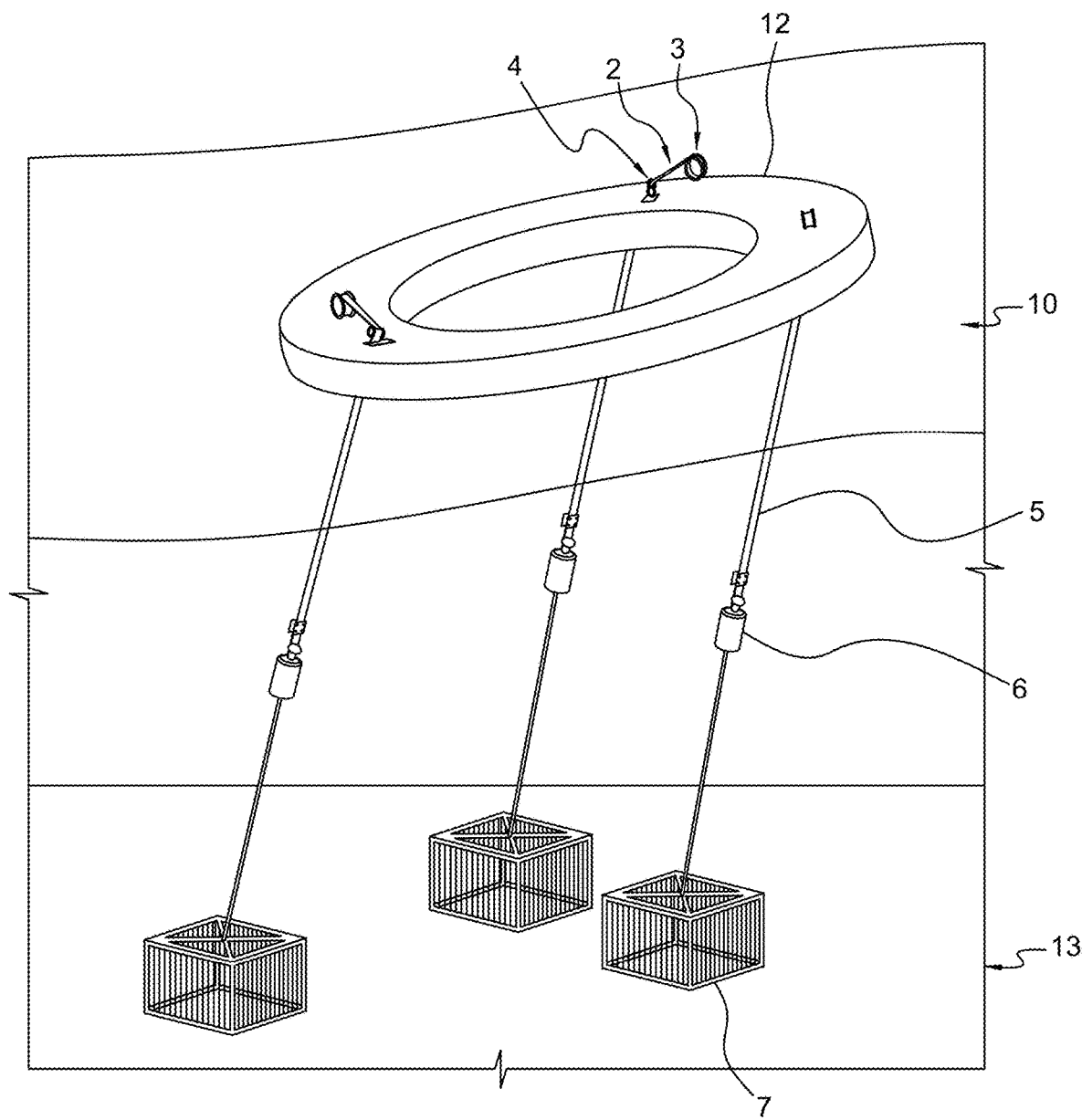
FIG. 2 is an overview of the floating device according to an embodiment of the invention with three mooring arrangements.

FIG. 1 shows a floating device 1 with one mooring arrangement 2. The mooring arrangement is arranged in the center of the floating device 1. The mooring arrangement 2 comprises a drum 3 and a band guide 4, 15. The band guide 4, 15 could be a single band guide 4 as shown in the FIG. 1 or a double band guide 15 as disclosed in FIG. 5a. A band 5 is extending from the drum 3 via the band guide 4, through an opening 11 in the floating device 1 towards an anchoring arrangement 13. The anchoring arrangement 13 comprising a subsea buoy 6, an anchor 7 and a rope 8 arranged below the sea surface 10 (FIG. 2). The band 5 is connected to the subsea buoy 6 through a band end fitting or a termination clamp 9. This will be further described in FIGS. 7 and 8.

The subsea buoy 6 are normally arranged between 8-12 m below the sea surface 10 but other distances from the sea surface 10 are also possible. The subsea buoy 6 is coupled to an anchor 7 or clump weight arranged at the seabed. The anchor 7 could have different shapes, like for instance chain basket as shown in the figures. The subsea buoy 6 is coupled to the anchor 7 through a rope 8, for instance a dyneema rope or nylon rope.

FIG. 2 shows a floating device shaped as a ring shaped floating foundation 12. The floating device 12 according to this embodiment having three mooring arrangements 2 disposed around the floating device 12. The mooring arrangements 2 are preferably equally disposed around the ring 12.

The composition of each of the mooring arrangements 2 are equal to the composition disclosed in FIG. 1 with a drum 3 and band guide 4 with a band 5 extending between the drum 3 and band guide 4. The same reference numbers are therefore refers to equal parts in the embodiments. The anchoring arrangements 13 are also similar as described in FIG. 1. Each mooring arrangement 2 is attached to one anchoring arrangement 13 as shown in the figure.

In this embodiment of the floating device 1, each of the mooring arrangements 2 comprising a single pulley arrangement 4. The single pulley arrangement 4 having only one guide pulley 14 for guiding the band 5 from the drum 3 towards the anchoring arrangement 13 and the seabed. A detailed view of the single band guide 4 can also be seen in FIGS. 3a and 3b.

The invention is not limited to one or three mooring arrangements 2. The floating device 1 could have two mooring arrangements or more than three mooring arrangements 2 as embodiments of the invention.

FIG. 3a shows a detailed view of the mooring arrangement 2 of the floating device 1, 12 according to the embodiment shown in FIGS. 1 and 2 viewed from the side.

Figure 3B:
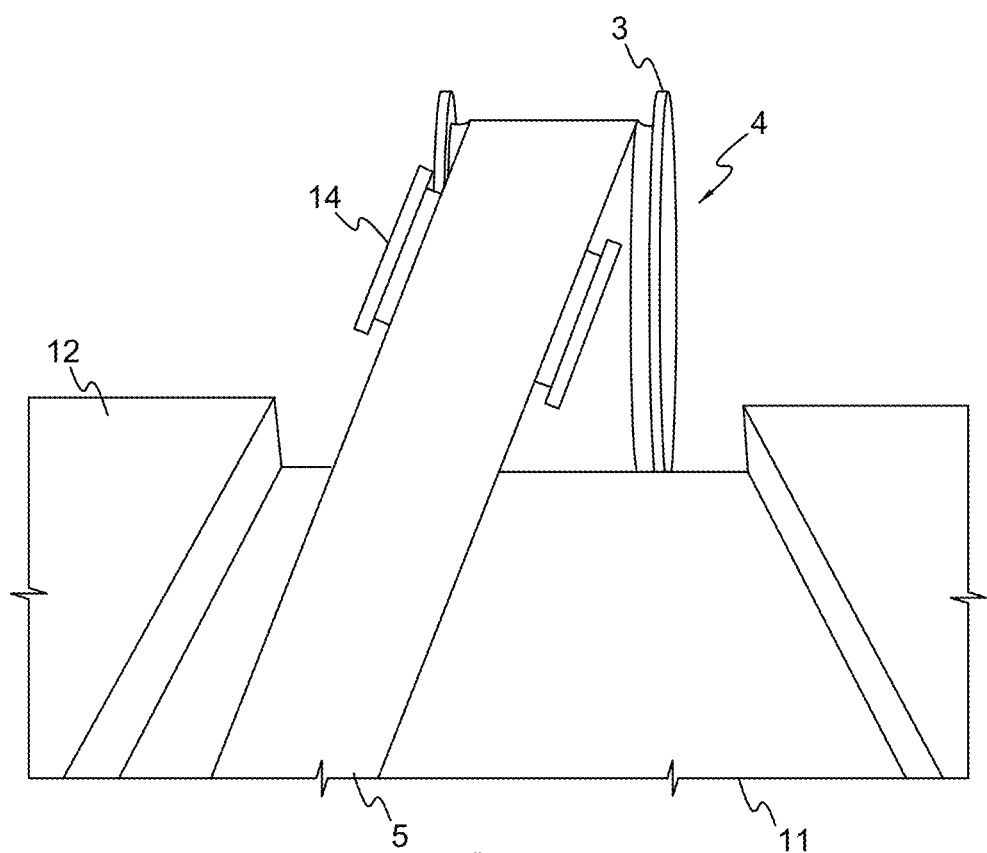

FIG. 3b shows the single pulley arrangement 4 front viewed. The single guide pulley 14 is arranged inclined in relation to the drum 3. This will be described more in detail below.

In FIG. 4 another embodiment of a floating device 12' according to the invention is shown. The floating device 12' having a mooring arrangement 2'. The single pulley arrangement 4 as disclosed in FIGS. 3a and 3b is in this embodiment replaced by a double band guide 15. This double band guide 15 having a first, top pulley 17 and a second, lower pulley 16. The first, top pulley 17 and the second, lower pulley 16 are connected to the same housing 20, 30. (shown in FIG. 6c-6f.) A detailed view of the double band guide 15 can also be seen in FIGS. 5a and 5b.

In FIG. 5a-5b both the first top pulley 17 and the second, lower pulley 16 are arranged inclined in relation to the drum 3. This will be described in more detail below.

The embodiment of the floating device of the FIG. 4 having one double band guide 15 and two single pulley arrangement 4. Other arrangement of the single 4 and double pulley arrangement 15 on the floating device 12' are possible embodiments of the invention, for instance could there be two double band guides 15 and one single pulley arrangement 4.

The single band guide 4 and the double band guide 15 are only shown schematically in the FIGS. 1-5. In addition the guide pulley 14, 16, 17 must be supported by a housing 18, 20, 30 or similar as shown in the FIGS. 6a-6k.

FIG. 6a shows the single guide pulley 14 arranged in a housing 18. This housing 18 comprising a first part 18a where the single guide pulley 14 is arranged, and a second part 18b connected to the deck of floating device 1, 12. The first part and second part are connected through bearings that allow relative articulation between the parts. The second part 18b having a cylindrical shape as shown in FIG. 6b. The second part 18b is rigidly connected to a base part 19. The base part 19 is fixedly attached to the deck of the floating device 1, 12. The base part 19 is extending upwardly on both sides the second part 18b. The housing 18 is adapted to rotate in relation to the base part 19 and the second part 18b.

The housing 18 is adapted to rotate around a center axis A of the cylindrical second part 18b, this center axis A is in the following called articulation axis A. The housing 18 and the base part 19 are pivotably connected to each other.

The guide pulley 14 is arranged in the first part 18a so that the articulation axis A is a tangential line of the single guide pulley 14. The guide pulley 14 will therefore not rotate in relation to its center, but will instead rotate around a point C on the periphery of the guide pulley 14. The point C is also a point on the articulation axis A.

The articulation axis A is congruent with the longitudinal axis of the band part 5a situated between the drum 3 and the guide pulley 14. This results in that the band rotates around its own longitudinal axis to compensate for the movement of the floating device.

In order for the band 5 to roll straight over the guide pulley 14 when the band 5 is winched in, it is crucial that the guide pulley 14 is aligned with a lower part 5b of the band 5 arranged below the guide pulley 14. The housing 18 rotates to compensate for the roll/pitch or the horizontal movement that the floating device are exposed to. This principle is shown in FIG. 9-11.

The guide pulley arrangement 4 is free to articulate around its rotation point C, the band 5 itself is the only force that pose any moment on the guide arrangement 4 and decide the articulation angle of band guide 4 and guide pulley 14 (gravity contribution is neglectable).

FIGS. 6c and 6d shows a similar arrangement with double band guide 15. The arrangement having a similar housing 20 with a first part 20a and a second part 20b. The second part 20b is equal to the second part 18b of the single pulley arrangement 13. The second part 20b is resting in a base part 21 as described in relation to the single pulley arrangement 14. The housing 20 is adapted to rotate around a center axis B of the second part 20b of the housing 20. In the first part 20a there are arranged a first pulley 17 and a second pulley 16. The pulleys 16, 17 are connected to the first part of housing 20a. The second, lower pulley 16 and the first, top pulley 17 is arranged in the same housing and rotates simultaneously about the center axis B.

The articulation of the first part 20a is defined as an axis through the center axis B of the second part 20b and which also is tangential line to the first, top guide pulley 17. The articulation axis is the same as the center axis B. The double guide pulley arrangement 1 will therefore rotate around a point D situated on this articulation axis B. The second, lower pulley 16 will therefore have an increase arm up to the articulation axis B that greatly increases the bands 5 moment on the guide pulleys 16, 17 and hence the bands 5 ability to align the guide arrangement 15 and guide pulleys 17,16 with itself to avoid sideway tracking. The second, lower pulley 16 also principally denies any misalignment angle to form between band 5 and first, upper guide pulley 17, which would cause sideway tracking of band 5 on the first, upper guide pulley 17.

In the embodiments described in FIG. 6a-f the housing 18, 20 are supported only on one side by the base part 19, 21.

The following FIG. 6e-6k shows another embodiment of the invention of the mooring arrangement 2. The figure shows a housing 30 with a double guide pulley 16, 17 in an arrangement 22. The housing 30 in this embodiment is supported on two sides by a frame 31. The housing 30 is rotatable coupled to the frame 31 on two sides instead of one as the previous embodiments.

FIG. 6e shows this arrangement in detail. The frame 31 could be attached to the floating device 1, 12, 12' through bolts and nuts, but it could also be attached to the floating device 1, 12, 12' in other ways.

As shown in the FIGS. 6e and 6f, the housing having a first cylinder shaped end 32a and a second cylinder shaped end 32b. These ends 32a, 32b are supported by bearings 33 arranged in the frame 31. The cylinder is adapted to rotate in relation to the frame through the bearings 33.

The cylinder shaped end 32a has an opening adapted to receive the band from the drum 3. The band 5 is further extending via the first guide pulley 17 and second guide pulley 16 and further through the opening to the anchoring arrangement 13 as described in the embodiment in FIG. 6a-6d. The opening 11 in the floating device 1, 12, 12' is arranged within the frame 31.

The frame 31 provides a better support to the band guide 22 and is therefore a preferred embodiment of the invention over the embodiments shown in FIG. 6a-6d.

The housing is adapted to rotate about a center axis B extending through the center of the cylinder shaped ends 32a. 32b. This is called the articulation axis B and is also a tangential line to the first, top pulley 17 in a point D. The center axis is also tangential over the drum 3 as shown in FIG. 6f. The part of the band 5a situated between the drum 3 and the first, top guide pulley is congruent with this line.

This ensures that the part of the band 5a between the drum 3 and the first top, pulley is not displaced laterally during articulation of the band guide 22, but rather twisting about its center.

The double band guide 22 will rotate about the articulation axis B which is not the center of the two guide pulleys 16, 17. The first, top guide pulley 17 will rotate bout the tangential point D. The second, lower guide pulley 16 is arranged beneath the first, top guide pulley 17 and there is a distance between the periphery of the guide pulley 16 and the articulation axis B. This results in an increased arm to the to the articulation axis B that greatly increases the bands 5 moment on the guide pulleys 16, 17 and hence the bands 5 ability to align the guide arrangement 15 and the guide pulleys 17, 16 with itself to avoid sideway tracking.

The principle is equal to the embodiments described in FIG. 6a-6d.

It is also another possible embodiment to replace the double pulley arrangement 15 as described in FIGS. 6e and 6f with a single pulley arrangement 4 as described in FIG. 3a so that the single pulley arrangement 4 is supported on two sides by the frame 31.

FIG. 6g shows the band guide in the housing 30. The band guide 15 is in this figure in a resting position where both guide pulleys are aligned in the vertical direction.

In FIG. 6h the band guide is in an active position where the guide pulleys and the housing are rotated in relation to the frame 31. The guide pulleys are also rotated in relation to the drum in this position.

FIG. 6i-k discloses the double band guide 15 further.

A pair of constrainer plates 34 and a set of bars 35 encapsulate the guide pulley 16, 17 to ensure that the band 5 do not end up outside a winch portion 16', 17' of the pulley 16, 17 even in case of zero or negative tension. The winch portion 16', 17' is the center part of the pulley 16, 17 where the band is in contact with the guide pulley 17, 16 as shown also in particular in FIG. 6j.

The bars 35 are adapted to hold the constrainer plates 34 in a suitable distance from each other and the winch portion 16', 17' between the constrainer plates 34 34, and to ensure band cannot be displaced upwards during zero or negative band tension.

This arrangement is also equally relevant for the single pulley arrangement 4 as well. The difference is that there is arranged only one guide pulley in the arrangement of constrainer plates 34 and bars 35.

FIG. 6l-6p shows a detail view of the guide pulley 14, 16, 17 viewed from different angles.

Figure 6L:
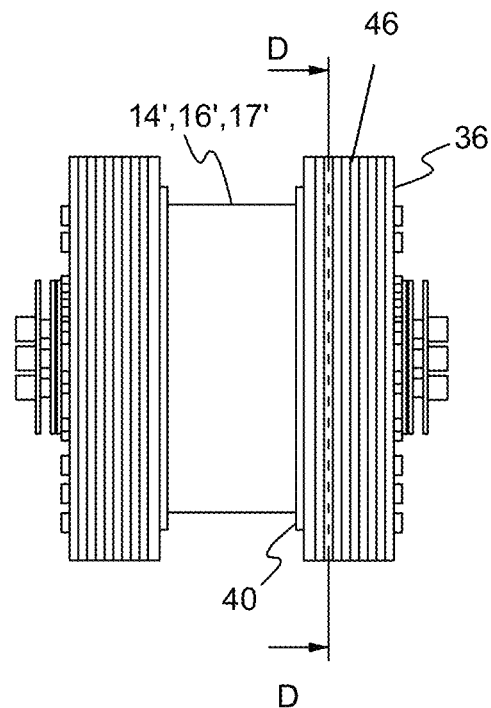

FIG. 6l shows the guide pulley 14, 16, 17 viewed from the same direction as the guide pulleys 16, 17 in FIG. 6k, but it is shown without the band 5. The guide pulley 14, 16, 17 comprising two side flanges 40 arranged on opposite sides of the guide pulley 14, 16, 17 and a smooth winch portion 14', 16', 17' where the guide pulley 14, 16, 17 is adapted to be in contact with the band 5.

This winch portion 14', 16, 17 is equal to the winch portion as described in FIG. 6i.

Figure 6M:
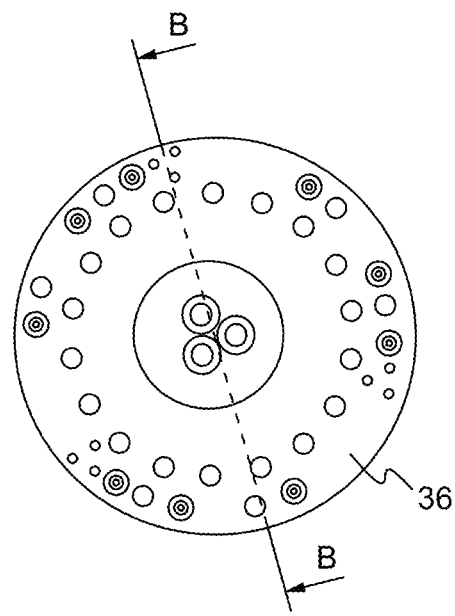
Figure 6N:
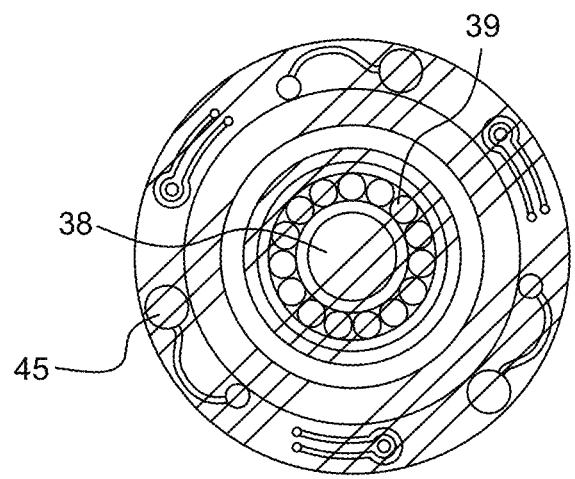

FIG. 6m-n shows the guide pulley viewed from the sides. In FIG. 6m only a back wall to hold the parts of the guide pulley together is shown. In FIG. 6n the different parts of the guide pulley 14, 16, 17 are viewed.

Figure 6O:
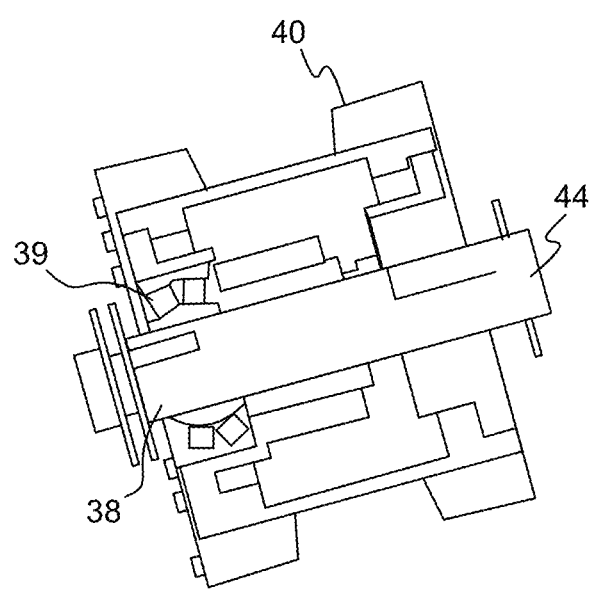
Figure 6P:
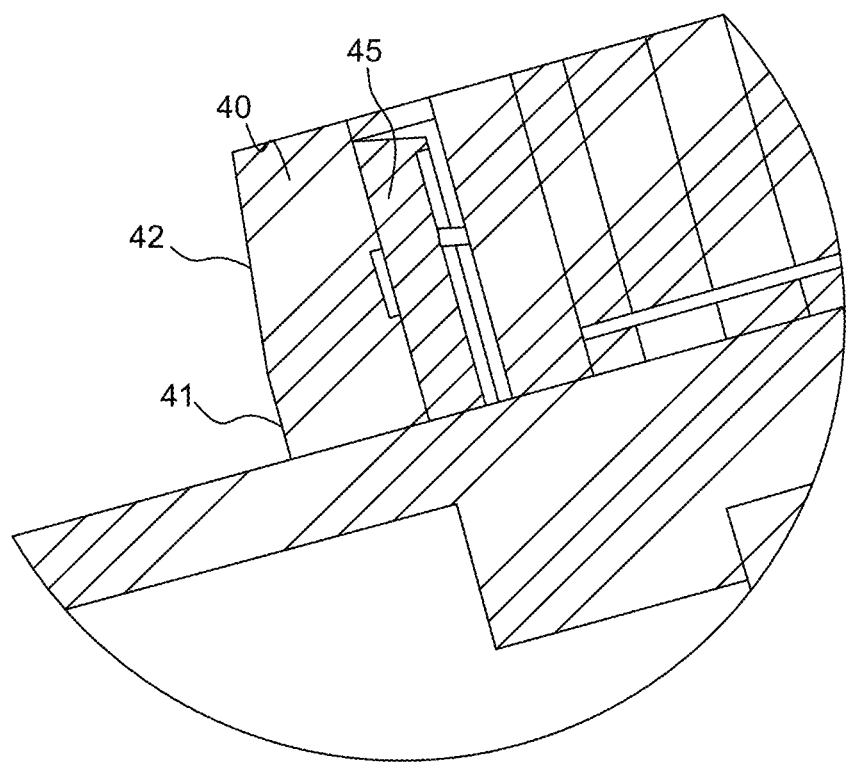

FIG. 6o shows a sectional view of the inside of the guide pulley 14, 16, 17 and FIG. 6p shows a detailed view of a load cell 45 arranged at the inside of the guide pulley shown in detail C.

The load cell 45 is arranged so that it is fixed rigidly to the back wall 36. Spacers 46 are rigidly fixed to back wall 36. The flange 40 is also bolted to the back wall 36, though spacers 46, but load cell sits in between spacers 46 and flange 40. This way flange 40 is pretensioned against load cell 45. It important that there is a gap between flange 40 and spacers 46 to allow deformation of flange 40 without flange 40 interfering with spacers 46 to ensure all load of flange 40 goes through load cell arrangement 45.

Load cell signal is transferred from rotating part 14, 16, 17 to a stationary shaft 38 by slip rings 43. From slip rings 43 signal wires exits pulley through center of shaft 44.

The flanges 40 and the winch portion are arranged to rotate around a center shaft 38 situated in the center of the guide pulley 14, 16, 17. Bearings 39 are arranged between the flanges 36, winch portion 14'. 16, 17' and the center shaft 38 as shown in the FIG. 6n.

An important property of the guide pulley 14, 16, 17 is the geometry and positioning of the guide pulley flanges 40. The bands 5 ability to ensure that the guide 4, 15, 22 and band 5 is aligned relies on the center plane of band and center plane of guide pulleys to intersect as much as possible, ie the band must be centered on the guide pulleys in the winch portion of the guide pulley 14', 16, 17'. In practice, due to imperfections in fabrications, band 5 will have a tendency to track laterally on the guide pulley 14, 16, 17. To ensure the above mentioned plan intersection, the flanges 40 on the guide pulleys 14, 16, 17 will prevent this tracking. The flanges 40 must have a vertical part 41 at least the height of the band 5, plus a tapered part 42 to ensure a smooth entry of the band 5. To minimize wear on the band 5 from interference with the flanges 40, there must be a certain clearance between the flange 40 and the band 5, hence the flange spacing ie the width of the winch portion 14', 16', 17' must be marginally larger than width of the band 5 by typically 1-2% of the band width.

FIG. 7a-7f shows a band fitting arrangement that could be used in relation to one of the embodiments of the invention.

FIG. 7a shows a detailed view of the anchoring arrangement described in FIG. 1, the anchoring arrangement 13 is situated below the floating device 1, 12 in the sea. The band 5 is in the lower end 5b attached to a band end fitting 9 as shown in FIG. 7b-7d.

A thin bend constrainer 23 are arranged on both sides of the band 5 to ensure a minimum bend radius about the orthogonal axis/the axis parallel to the band plane E. The bend constrainer 23 could be made of polyetylen or other flexible material. The bend constrainer is best shown in FIGS. 7c and 7d.

The band end fitting 9 could also have a buoyancy float 24 to ensure that the end fitting is always straight even without the band tension.

The band end fitting 9 is connected to the subsea buoy 6 through a bolted connection 25. The band end fitting 9 is thus allowed to pivot freely about the bolted connection 25. The connection allows articulation about one axis normal to the band plane.

The subsea buoy 6 will be influenced by forces from both the band tension and the buoyancy.

Depending on the magnitude of the tension of the band 5, the subsea buoy 6 will find a static equilibrium orientation. This orientation may be angled in relation to an axis E through the longitudinal direction of the band 5. The orientation may also be in line with the axis E.

FIG. 7a shows the band end fitting 9 used in a floating device 1 with only one mooring arrangement 2. This embodiment of the band end fitting 9 could easily also be used in a floating device with more than one mooring arrangement 2, for example three as shown in FIG. 8b.

FIG. 7c shows a band end fitting drum 28 which is arranged between the band 5 and the subsea buoy 6. The band end fitting drum 28 is adapted to wind the band 5 on the drum 28. Normally the band is wrapped 2.5 times around the band end fitting drum 28, but more or less of the band wrapped around the band end fitting 28 is possible embodiments.

FIGS. 7e and 7f shows the fastening device 29 of the band 5 to the band fitting drum 28. The fastening device 29 has a cylinder shaped end portion 29a that is adapted to match with a pin or similar in the band fitting drum 28.

The pin/cylinder connection allows a quick connection or disconnection of the band 5 from the band end fitting drum 28.

The fastening device also comprises a clamp 29b adapted to be connected to the band. The clamp 29b has a curved surface to minimize the interference to band wrapping on top of the clamp 29b.

The pin/cylinder connection also allows the clamp 29b to swing out in case all band 5 on the drum 3 is pulled out and the end stop is reached.

FIG. 8a-8c shows another embodiment of a band end fitting 26. In this embodiment, there are arranged floats 27 on both sides of the belt end fitting 26. There are also shown a load cell 28 arranged between the band end fitting 26 and the subsea buoy 6.

The load cell 28 are configured to monitor the tension between the band 5 and the mooring arrangement and adjust the tension accordingly.

The load cell is also a possible embodiment in the band end fitting arrangement 9 in FIG. 7a-7f.

FIGS. 8b and 8c shows the band end fitting and subsea buoy arranged in a floating device 12 with three mooring arrangements 2. The load cell 27 and the band end fitting 27 could also easily be used in a floating device with only one mooring arrangement 2 as shown in FIG. 7a-7f.

Both the embodiments of the band end fittings 9, 26 are embodiments to both the single pulley arrangement 2 and double pulley arrangement 2'.

The floating device is anchored to the seabed through chain basket 7 as shown in FIGS. 7a and 8b. The number of chain baskets 7 are equal to the number of mooring arrangements 2 on the floating device 1, 12, 12'.

The functioning of the invention will now be described with help from the FIGS. 9-11.

FIG. 9 is illustrating the mooring arrangement without any band guides. When the floating device 1, 12, 12' is exposed to horizontal motion, roll or pitch motion, the band 5 will be pulled away from the vertical resting position. The drum 3 and anchor arrangement 13 will be positioned relative each other so that there will be a bend in the band 5. This will cause a strain or kink in the band 5 when the band is rolled up on the drum 3, which after a while may lead to tear and break of the band 5.

When the floating device 1, 12, 12' are moored to the seabed, the horizontal movement, roll and pitch movement will cause the drum 3 to winch the band 5 to adjust the movement and keep the mooring arrangement straight at all times. There will be only a small part of the band 5 that are winched on and off the drum 3 because of the movement of the floating device 1, 12, 12' It is therefore only a small part of the band 5 that repeatedly will be exposed to wear due to movement of the floating device 1, 12, 12'.

The band guide 4, 15 is therefore introduced. This arrangement is adapted to tilt and follow the band 5 so that the band 5 as a result enters a pulley that is aligned due to the movement of the floating device 1, 12, 12'. The band guide 4, 15 is in this position in the active position as shown in FIG. 6h.

The part of the band between the drum and the band guide will experience a twist between the guide pulley and the drum, but this is considered to be less harmful than the previous arrangement without the band guide shown in FIG. 9a.

The ability for the guide pulley to rotate and follow the angle of the band 5 as shown in FIG. 9b will result in a winching of the band 5 that is more gentle to the band 5 and reduce the wear of the band 5. In addition it will be easier to winch the band 5 and reduce any kink since the band guide 4, 15 improves the position of the part 5a of the band 5 that are winched onto the drum 3.

The band guide 4, 15 is adapted to rotate so that the guide pulley 14, 16, 17 is aligned with the lower part of the band 5b. This will cause an even distribution the tension forces in the band 5 over the whole length of the guide pulley 14, 16, 17.

FIGS. 10a and 10 shows the relation between the drum and the band guide 4, 15. The embodiment with the single guide pulley 14 and the housing supported on one side (FIG. 6a-6d) is used as an illustrative example but there will no difference with the double band guide 15 and the housing with two support (FIG. 6e-6h).

The band guide 4, 15 is adapted to rotate to adjust for the movement of the floating device 1, 12. The band guide 4, 15 is adapted to rotate or pivot about a central axis A of the cylindrical part 18b, 20b of the housing as described earlier.

In other words, the guide pulley 14, 16, 17 is adapted to articulate about the articulation axis A that passes in the longitudinal direction of the band 5.

A plane G through the drum 3 and a plane H through the guide pulley 14, 16, 17 remain parallel at all positions of the band guide 4, 15.

FIG. 11a and FIG. 11b shows the principle where the floating device 1, 12 is displaced in the vertical direction. The axis through the longitudinal direction of the band 5 is inclined in relation to a vertical line. The angle difference is shown as α in the FIGS. 11a and 11b.

Figure 11C:
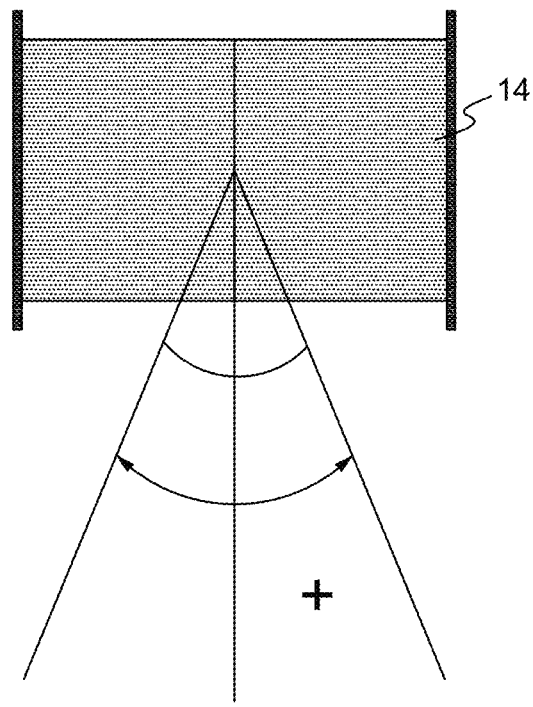

FIG. 11c illustrating possible movements of the guide pulley 14, 16, 17 due to roll movement. The guide pulley 14, 16, 17 could for instance rotate in the direction of the arrow up to +/−35' but also larger angle is possible.

Figure 11D:
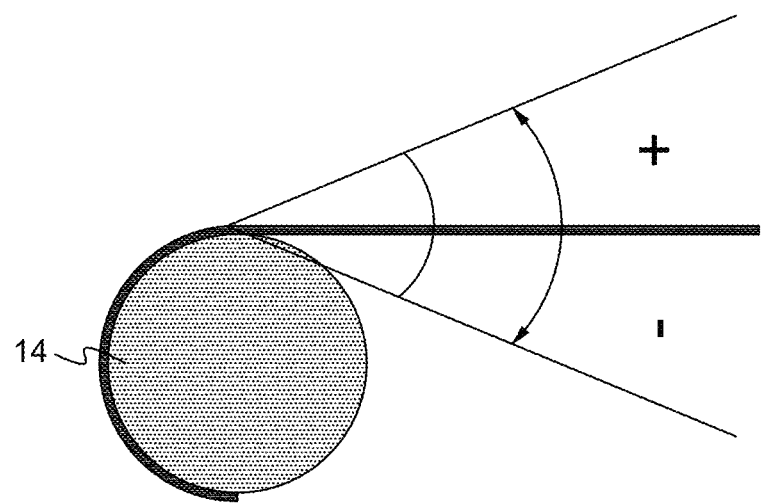

FIG. 11d shows movements of the band 5 due to pitch movement. The band will be forced a distance from the guide pulley or towards the guide pulley 14, 16, 17 depending on the direction of movement. This movement will not cause any rotation of the band guide because drum 3 and the guide pulley 14, 16.17 are substantially aligned in a straight line during the movement.

In all the embodiments of the invention there could be arranged a sensor (not shown) that measures the lateral forces between the band 5 and the guide pulley flanges. The tension could then be reduces if the lateral force is too large.

Figure 15:
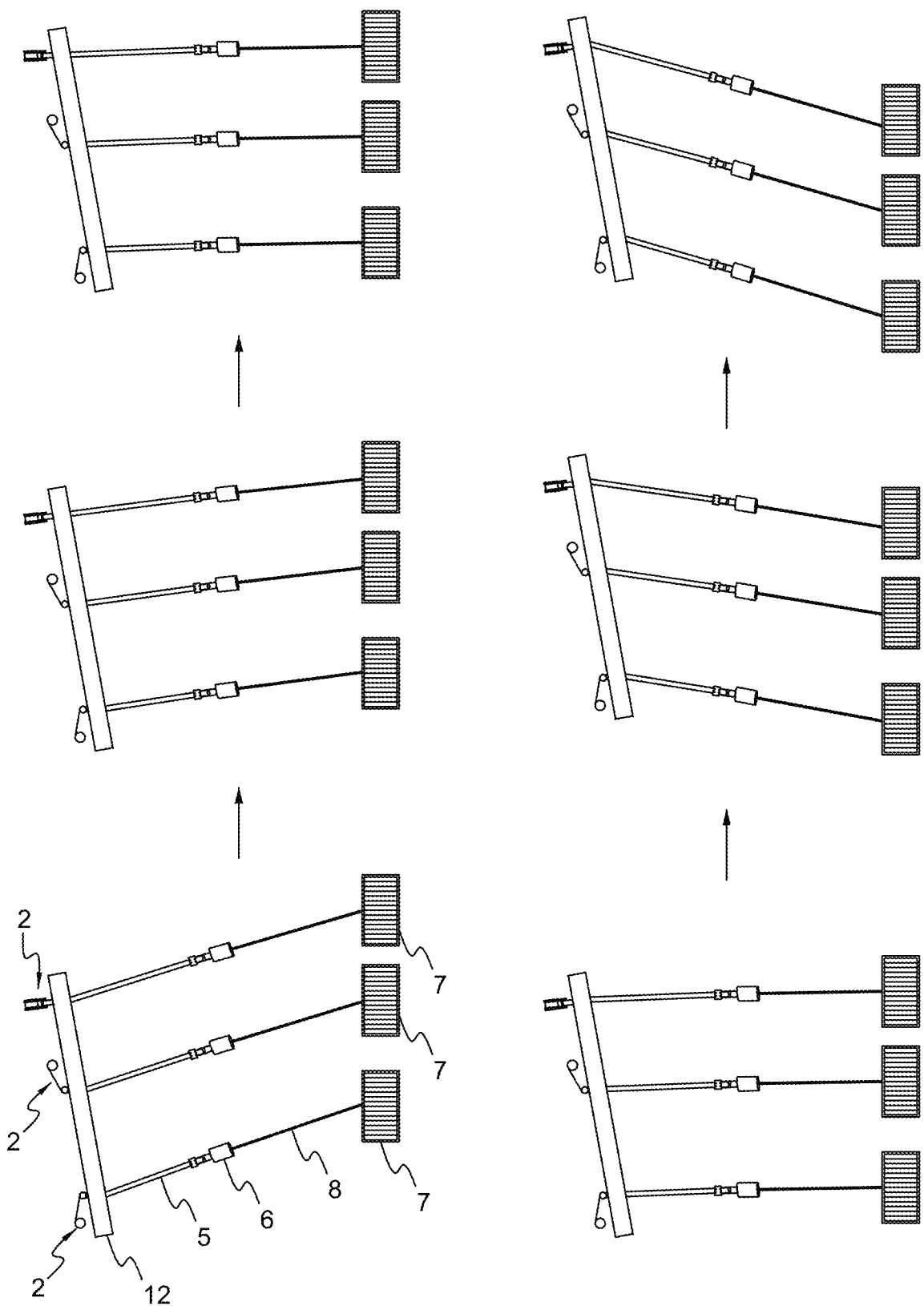
Figure 15C:
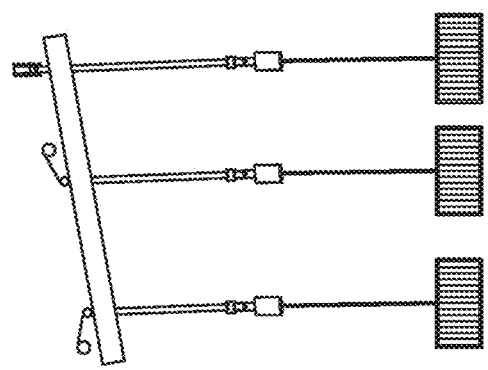
Figure 15F:
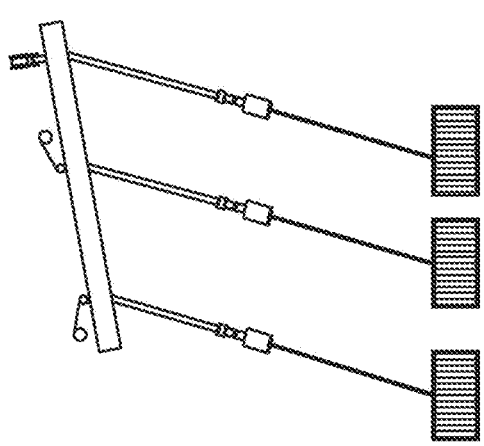
Figure 15B:
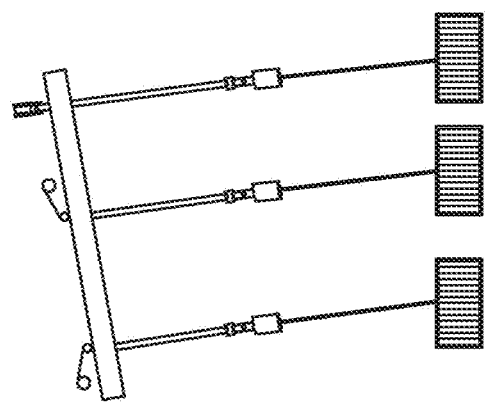
Figure 15E:
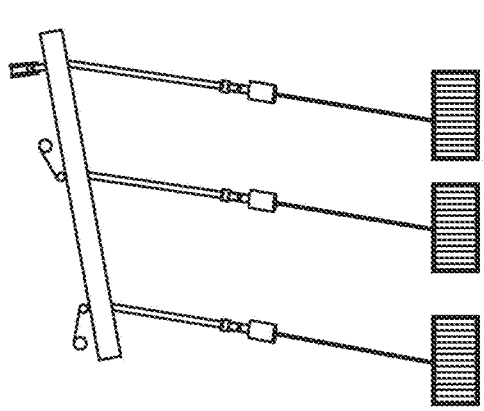
Figure 15A:
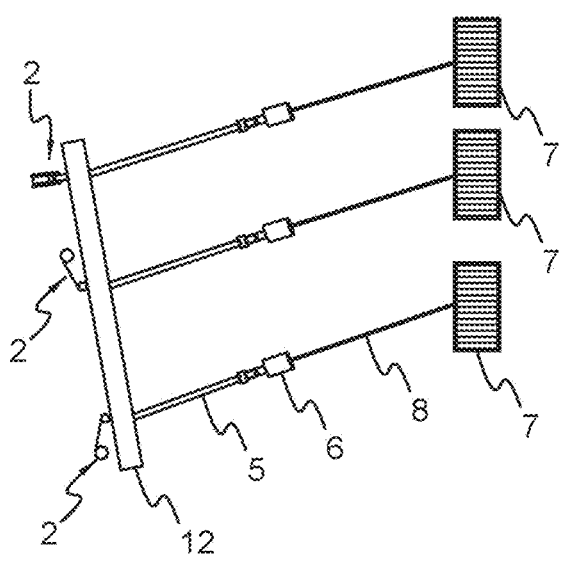
Figure 15D:
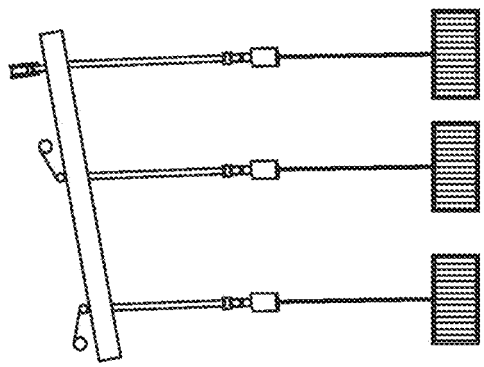

FIG. 12-15 shows different position or movement of the floating device 1 illustrated by a floating arrangement with one mooring arrangement in FIGS. 12-14 and by the floating arrangement with three mooring arrangements in FIG. 15.

FIG. 12 shows the floating device 1 where there is no roll, pitch or drift motion acting on the floating device.

The band 5, rope 9 and the anchor 7 are arranged in a vertical line. In this position, there is no articulation angle or increased wrap sector imposed on the guide pulley 14.

FIG. 13a-13b shows the floating device exposed to roll and pitch motion. This roll and pitch motion are imposed to the rigid floating device from the waves. Usually the floating device will tilt about +/−5 degrees from the horizontal plane. Tilting angles up to +/−45 degrees and higher are however possible. FIG. 13a shows a floating device exposed to roll motion, while FIG. 13b shows the floating device exposed to pitch motion.

FIG. 14 shows the floating device exposed to horizontal drift. Horizontal drift is caused by current, wind and waves that leads to a horizontal distance between the floating device 1, 12 and mooring point (anchor) 7. This gives rise to an angle between the band 5 and drum 3.

FIG. 15a-f shows the floating device 12 and movement of this in the sea when a wave is passing from left. The mooring 2 and anchoring arrangement 13 are configured to maintain constant tension by controlling torque on the drum, allowing band to be pulled out when floating structure is displaced relative to anchoring point, and wound back onto drum 3 when floating structure moves back.

Although illustrative embodiments of the invention have been disclosed in detail herein, with reference to the accompanying drawings, it is understood that the invention is not limited to the precise embodiments shown and that various changes and modifications can be affected therein by one skilled in the art without departing from the scope of the invention as defined by the appended claims and their equivalents.

The invention claimed is:

1. A mooring arrangement for a floating device, the mooring arrangement comprising:
   a flat band;
   a drum adapted to pay out and pull in the flat band;
   a band guide comprising a guide pulley, the flat band extending from the drum via the band guide and adapted to be coupled to an anchoring arrangement;
   wherein the band guide is configured to tilt about an articulation axis parallel with a longitudinal axis of a part of the band situated between the drum and the band guide in order to position the flat band to compensate for movement in the floating device and thereby reduce wear to the flat band; and
   wherein the articulation axis is tangential to the drum and the guide pulley.

2. The mooring arrangement according to claim 1, wherein the mooring arrangement comprises a base part adapted to be connected to the floating device, the band guide being pivotably coupled to the base part.

3. The mooring arrangement according to claim 2, wherein the base part is a frame having two legs adapted to support the band guide two on opposite sides.

4. The mooring arrangement according to claim 1, wherein the band guide comprises a single pulley.

5. The mooring arrangement according to claim 1, wherein:
   the band guide comprises first and second pulleys; and
   the first and second pulley are arranged in series in the longitudinal direction of the band guide.

6. The mooring arrangement according to claim 5, wherein the first pulley and second pulley are coupled to the same housing.

7. The mooring arrangement according to claim 1, wherein the mooring arrangement has a sensor/load cell arrangement for measuring lateral load between the flat band and a guide pulley flange.

8. The mooring arrangement according to claim 4, wherein the guide pulley comprises a winch portion adapted to receive the flat band and flanges arranged outside of the winch portion.

9. The mooring arrangement according to claim 8, wherein the height of the flanges above the winch portion are at least the thickness of the flat band.

10. The mooring arrangement according to claim 1, wherein the mooring arrangement comprises a band end fitting coupling the mooring arrangement to the anchoring arrangement.

11. The mooring arrangement according to claim 10, wherein the band end fitting has a bend constrainer arranged on both sides of the flat band.

12. The mooring arrangement according to claim 10, wherein the band end fitting comprising a float.

13. The mooring arrangement according to claim 10, comprising a load cell arranged between the band end fitting and the anchoring arrangement.

14. A floating device comprising at least one mooring arrangement according to claim 1.

* * * * *